US011825955B2

(12) United States Patent
Deevers et al.

(10) Patent No.: US 11,825,955 B2
(45) Date of Patent: Nov. 28, 2023

(54) SEATING ARRANGEMENT AND METHOD OF CONSTRUCTION

(71) Applicant: Steelcase Inc., Grand Rapids, MI (US)

(72) Inventors: Nickolaus William Charles Deevers, Holland, MI (US); Kurt R. Heidmann, Grand Rapids, MI (US); Michael J. Kemen, Lowell, MI (US)

(73) Assignee: Steelcase Inc., Grand Rapids, MI (US)

(*) Notice: Subject to any disclaimer, the term of this patent is extended or adjusted under 35 U.S.C. 154(b) by 310 days.

(21) Appl. No.: 17/183,461

(22) Filed: Feb. 24, 2021

(65) Prior Publication Data

US 2021/0177149 A1 Jun. 17, 2021

Related U.S. Application Data

(63) Continuation of application No. 15/997,128, filed on Jun. 4, 2018, now Pat. No. 10,966,527.

(60) Provisional application No. 62/653,275, filed on Apr. 5, 2018, provisional application No. 62/517,270, filed on Jun. 9, 2017.

(51) Int. Cl.

| | |
|---|---|
| ***A47C 1/032*** | (2006.01) |
| ***A47C 3/12*** | (2006.01) |
| ***A47C 5/12*** | (2006.01) |
| ***A47C 7/00*** | (2006.01) |

(52) U.S. Cl.

CPC ............ *A47C 3/12* (2013.01); *A47C 1/03255* (2013.01); *A47C 5/12* (2013.01); *A47C 7/004* (2013.01)

(58) Field of Classification Search

CPC ......... A47C 1/03255; A47C 3/12; A47C 5/12; A47C 1/033; A47C 1/03274; A47C 1/03261

See application file for complete search history.

(56) References Cited

U.S. PATENT DOCUMENTS

| | | | |
|---|---|---|---|
| 120,382 | A | 10/1871 | Heywood |
| 362,796 | A | 5/1887 | Tait |
| 386,142 | A | 7/1888 | Lewis |
| 501,317 | A | 7/1893 | Boland |
| 1,732,647 | A | 10/1929 | Flintermann |
| 1,825,581 | A | 9/1931 | Comerford |

(Continued)

FOREIGN PATENT DOCUMENTS

| | | | |
|---|---|---|---|
| AT | 505212 | A1 | 11/2008 |
| DE | 3605809 | A1 | 8/1987 |

(Continued)

OTHER PUBLICATIONS

European Patent Office; Supplementary European Search Report; dated Feb. 3, 2021; entire document.

*Primary Examiner* — Timothy J Brindley

(74) *Attorney, Agent, or Firm* — Price Heneveld LLP

(57) ABSTRACT

A seating arrangement includes a base member, and an integrally formed support member coupled to the base member and supporting a seat moveable from an upright position to a reclined position, wherein a portion of the support member is bendable as the seat moves from the upright position to the reclined position such that a first side of the support member is put in tension and a second side generally opposite the first side is put in compression, and wherein the first side includes a tensile substrate so that the first side has as higher modulus of elasticity than the second side.

27 Claims, 18 Drawing Sheets

(56) References Cited

U.S. PATENT DOCUMENTS 1,962,464 A 6/1934 Richtsteig
2,271,925 A 2/1939 Niles
2,321,385 A 6/1943 Herold
2,530,924 A 11/1950 Turner
2,731,078 A 1/1956 Cadman et al.
2,764,228 A 9/1956 Donohue
2,818,911 A 1/1958 Syak
D183,440 S 8/1958 Williams
2,855,984 A 10/1958 Majorana et al.
2,921,622 A 1/1960 Henrikson et al.
2,993,733 A 7/1961 Pinkham
D192,165 S 2/1962 Brandon
3,027,191 A 3/1962 Lie
3,052,459 A 9/1962 Belsky
3,053,571 A 9/1962 Fox
3,081,077 A 3/1963 Sudman
3,120,407 A 2/1964 Propst
3,133,765 A 5/1964 Kramer
3,135,551 A 6/1964 Andreoli et al.
3,165,307 A 1/1965 Edwards
D200,640 S 3/1965 Yamasaki
3,201,172 A 8/1965 Bliss
3,241,884 A 3/1966 Thatcher et al.
3,309,136 A 3/1967 Kehoe
3,316,018 A 4/1967 Stith
D207,955 S 6/1967 Rodrigo
3,353,869 A 11/1967 Getz et al.
3,369,840 A 2/1968 Dufton
2,616,484 A 11/1969 Christie
3,557,264 A 1/1971 Getz et al.
3,583,759 A 6/1971 Kramer
3,586,370 A 6/1971 Barecki et al.
3,669,496 A 6/1972 Chisholm
3,669,499 A 6/1972 Semplonius et al.
3,693,925 A 9/1972 Weinstein
3,712,666 A 1/1973 Stoll
3,740,096 A 6/1973 Bridger
3,741,607 A 6/1973 Cramer
D227,829 S 7/1973 Klose
3,756,656 A 9/1973 Weick
3,758,159 A 9/1973 Morris
D228,717 S 10/1973 Kramer
3,780,353 A 12/1973 Gordon et al.
3,806,192 A 4/1974 Ohlrogge et al.
3,815,956 A 6/1974 Bocksch et al.
3,823,980 A 6/1974 Harnick
3,841,704 A 10/1974 Platner et al.
3,851,917 A 12/1974 Horstmann et al.
3,856,981 A 12/1974 Boundy
3,874,727 A 4/1975 Mehbert et al.
3,883,173 A 5/1975 Shephard et al.
3,883,176 A 5/1975 Morton
3,913,975 A 10/1975 Carter
3,964,789 A 6/1976 Platner et al.
4,013,258 A 3/1977 Doerner
4,032,190 A 6/1977 Müller-Deisig et al.
4,054,317 A 10/1977 Stumpf
4,088,367 A 5/1978 Atkinson et al.
4,123,105 A 10/1978 Frey et al.
4,143,910 A 3/1979 Geffers et al.
D255,183 S 6/1980 Locher
D255,184 S 6/1980 Locher
4,205,880 A 6/1980 Trotman et al.
4,331,360 A 5/1982 Roudybush et al.
4,368,917 A 1/1983 Urai
4,371,142 A 2/1983 Bottemiller et al.
4,379,589 A 4/1983 Marino
4,380,352 A 4/1983 Diffrient
4,384,741 A 5/1983 Flum et al.
4,390,204 A 6/1983 Fleishman
4,411,468 A 10/1983 Apissomian
4,418,958 A 12/1983 Watkin
4,451,085 A 5/1984 Franck et al.
4,471,994 A 9/1984 Zünd et al.
4,478,454 A 10/1984 Faiks
4,498,702 A 2/1985 Raftery
4,502,731 A 3/1985 Snider
4,519,651 A 5/1985 Whitwam
4,521,053 A 6/1985 de Boer
4,526,421 A 7/1985 Brennan et al.
4,529,247 A 7/1985 Stumpf et al.
4,533,174 A 8/1985 Fleishman
4,533,177 A 8/1985 Latone
4,556,254 A 12/1985 Roberts
4,560,199 A 12/1985 Sapper
4,577,907 A 3/1986 Talmon et al.
4,585,272 A 4/1986 Ballarini
4,586,748 A 5/1986 Dingler et al.
4,607,883 A 8/1986 Tzu-Chun
4,640,548 A 2/1987 Desanta
4,647,109 A 3/1987 Christophersen et al.
D289,120 S 4/1987 Chadwick et al.
4,660,887 A 4/1987 Fleming et al.
4,671,570 A 6/1987 Hockenberry et al.
4,673,212 A 6/1987 Mayer
4,682,814 A 7/1987 Hansen
4,685,730 A 8/1987 Linguanotto
4,689,624 A 8/1987 Kago et al.
4,695,093 A 9/1987 Suhr et al.
4,707,026 A 11/1987 Johansson
4,709,962 A 12/1987 Steinmann
4,711,491 A 12/1987 Ginat
4,711,497 A 12/1987 Kazaoka et al.
4,713,918 A 12/1987 Cioffi
4,718,716 A 1/1988 Stumpf et al.
4,732,281 A 3/1988 Hall, II et al.
4,733,910 A 3/1988 Brennan
4,744,603 A 5/1988 Knoblock
4,761,033 A 8/1988 Lanuzzi et al.
4,765,679 A 8/1988 Lanuzzi et al.
4,773,706 A 9/1988 Hinrichs
4,775,185 A 10/1988 Scholin et al.
4,776,633 A 10/1988 Knoblock et al.
4,783,121 A 11/1988 Luyk et al.
4,789,203 A 12/1988 van Zee et al.
4,790,501 A 12/1988 Waters
4,790,595 A 12/1988 Hensel et al.
4,790,598 A 12/1988 Locher
4,838,612 A 6/1989 Cross
4,848,837 A 7/1989 Völkle
4,854,641 A 8/1989 Reineman et al.
4,856,845 A 8/1989 Massonnet
4,856,846 A 8/1989 Lohmeyer
4,865,384 A 9/1989 Desanta
4,869,552 A 9/1989 Tolleson et al.
4,877,290 A 10/1989 Schetl
4,883,320 A 11/1989 Izumida et al.
4,889,385 A 12/1989 Chadwick et al.
4,890,886 A 1/1990 Opsvik
4,892,356 A 1/1990 Pittman et al.
4,911,501 A 3/1990 Decker et al.
D307,221 S 4/1990 Mudge
4,913,493 A 4/1990 Heidmann
4,938,530 A 7/1990 Snyder et al.
4,938,532 A 7/1990 Burgess
4,948,198 A 8/1990 Crossman et al.
4,953,913 A 9/1990 Graebe
4,962,964 A 10/1990 Snodgrass
4,966,411 A 10/1990 Katagiri et al.
4,981,326 A 1/1991 Heidmann
5,015,038 A 5/1991 Mrotz, III
5,018,787 A 5/1991 Estkowski et al.
5,022,709 A 6/1991 Marchino
5,039,163 A 8/1991 Tolleson
5,042,876 A 8/1991 Faiks
5,050,931 A 9/1991 Knoblock
5,052,753 A 10/1991 Buchacz
5,076,646 A 12/1991 Matte
5,080,318 A 1/1992 Takamatsu et al.
5,080,433 A 1/1992 Hayden
5,080,435 A 1/1992 Desanta
5,100,201 A 3/1992 Becker, III et al.
5,102,196 A 4/1992 Kaneda et al.
5,123,702 A 6/1992 Caruso

(56) References Cited

U.S. PATENT DOCUMENTS 5,154,485 A 10/1992 Fleishman
5,192,114 A 3/1993 Hollington et al.
5,201,306 A 4/1993 Kinny
5,203,853 A 4/1993 Caruso
5,213,394 A 5/1993 Tattrie
5,214,836 A 6/1993 Beals
RE34,354 E 8/1993 Sondergeld
5,249,839 A 10/1993 Faiks et al.
5,267,777 A 12/1993 Valtri
5,288,138 A 2/1994 Stulik et al.
5,303,978 A 4/1994 Murrey
5,308,145 A 5/1994 Koepke et al.
5,314,237 A 5/1994 Koepke et al.
5,314,240 A 5/1994 Ishi et al.
5,318,346 A 6/1994 Roossien et al.
5,320,373 A 6/1994 Robertson et al.
5,320,410 A 6/1994 Faiks et al.
5,326,410 A 7/1994 Boyles
5,333,934 A 8/1994 Knoblock
5,335,969 A 8/1994 Yamaguchi et al.
5,338,099 A 8/1994 Ishi et al.
5,340,197 A 8/1994 Vogtherr
5,348,367 A 9/1994 Mizelle
5,348,372 A 9/1994 Takamatsu et al.
D351,744 S 10/1994 Caruso et al.
5,352,022 A 10/1994 Knoblock
5,354,120 A 10/1994 Völkle
5,380,063 A 1/1995 Dauphin
5,381,994 A 1/1995 Welch
5,401,077 A 3/1995 Hosoe
5,406,760 A 4/1995 Edwards
D358,514 S 5/1995 Lovegrove
5,411,316 A 5/1995 Lovegrove et al.
5,425,566 A 6/1995 Buchacz
D360,316 S 7/1995 Hodge et al.
5,462,339 A 10/1995 Schmale et al.
5,486,035 A 1/1996 Koepke et al.
5,487,591 A 1/1996 Knoblock
5,499,413 A 3/1996 Van Hekken
5,518,294 A 5/1996 Ligon, Sr. et al.
5,536,067 A 7/1996 Pinto
5,538,326 A 7/1996 Lorbiecki
5,564,783 A 10/1996 Elzenbeck et al.
5,567,012 A 10/1996 Knoblock
5,577,807 A 11/1996 Hodge et al.
5,577,811 A 11/1996 Ogg
D376,982 S 12/1996 Otto
5,582,459 A 12/1996 Hama et al.
5,584,533 A 12/1996 Schrewe
5,599,069 A 2/1997 Lorbiecki
5,601,336 A 2/1997 Troyas-Bermejo
D378,480 S 3/1997 Doerner
5,611,598 A 3/1997 Knoblock
5,626,389 A 5/1997 Logan, Jr.
5,630,643 A 5/1997 Scholten et al.
5,642,593 A 7/1997 Shieh
5,649,740 A 7/1997 Hodgdon
5,653,499 A 8/1997 Goodall
5,658,045 A 8/1997 Van Koolwijk et al.
5,660,439 A 8/1997 Unwalla
5,662,381 A 9/1997 Roossien et al.
5,664,835 A 9/1997 Desanta
5,681,092 A 10/1997 Hanson et al.
5,681,093 A 10/1997 Pfister
5,716,099 A 2/1998 McDiarmid
5,725,277 A 3/1998 Knoblock
5,733,005 A 3/1998 Aufrere et al.
5,765,914 A 6/1998 Britain et al.
5,775,774 A 7/1998 Okano
5,804,763 A 9/1998 Smeenge
5,806,258 A 9/1998 Miedema et al.
5,806,930 A 9/1998 Knoblock
5,810,438 A 9/1998 Newhouse
5,810,440 A 9/1998 Unwalla
5,826,940 A 10/1998 Hodgdon
5,839,784 A 11/1998 Breen
5,857,739 A 1/1999 Smith
5,868,466 A 2/1999 Massara et al.
5,868,468 A 2/1999 Wang
5,871,258 A 2/1999 Battey et al.
5,934,758 A 8/1999 Ritch et al.
5,944,387 A 8/1999 Stumpf
5,953,871 A 9/1999 MacConnell et al.
5,957,534 A 9/1999 Wilkerson et al.
5,971,481 A 10/1999 Emmenegger et al.
5,984,411 A 11/1999 Galumbeck
5,997,094 A 12/1999 Cvek
6,021,712 A 2/2000 Harrop
6,047,508 A 4/2000 Goodman et al.
6,050,637 A 4/2000 Håland et al.
6,056,361 A 5/2000 Cvek
6,056,366 A 5/2000 Haynes et al.
6,074,004 A 6/2000 Carmichael
6,094,875 A 8/2000 Laine
6,099,075 A 8/2000 Watkins
6,109,693 A 8/2000 Bauer et al.
6,120,096 A 9/2000 Miotto
D437,497 S 2/2001 Bräuning
6,193,318 B1 2/2001 Becker et al.
D445,580 S 7/2001 Pennington et al.
6,257,665 B1 7/2001 Nagamitsu et al.
6,273,506 B1 8/2001 Niergarth et al.
6,361,110 B2 3/2002 Roslund, Jr. et al.
6,388,190 B1 5/2002 Laukhuf et al.
6,394,548 B1 5/2002 Battey et al.
6,402,244 B1 6/2002 Schönenberg et al.
6,406,096 B1 6/2002 Barile, Sr.
6,409,268 B1 6/2002 Cvek
6,412,869 B1 7/2002 Pearce
6,422,650 B1 7/2002 Chien-Shen
D461,660 S 8/2002 Koepke et al.
D461,661 S 8/2002 Koepke et al.
6,431,649 B1 8/2002 Hensel
D462,536 S 9/2002 Levy
6,447,063 B1 9/2002 Beggs
6,471,293 B2 10/2002 Ware et al.
6,478,379 B1 * 11/2002 Ambasz ................ A47C 7/024
297/284.3
6,490,829 B1 12/2002 Schreiner et al.
6,513,222 B2 2/2003 Von Ehr et al.
6,523,896 B1 2/2003 Uhlenbrock
6,533,352 B1 3/2003 Glass et al.
6,536,841 B1 3/2003 Pearce et al.
D474,346 S 5/2003 Saylor et al.
D474,926 S 5/2003 Koepke et al.
6,557,310 B2 5/2003 Marshall et al.
6,565,152 B2 5/2003 Craft et al.
6,568,760 B2 5/2003 Davis et al.
D476,821 S 7/2003 Koepke et al.
6,607,244 B2 8/2003 Stulik et al.
6,609,755 B2 8/2003 Koepke et al.
6,616,231 B2 9/2003 Koepke et al.
6,634,717 B2 10/2003 Kown
6,659,560 B1 12/2003 Chi
6,669,292 B2 12/2003 Koepke et al.
6,679,551 B2 1/2004 Ware et al.
6,688,686 B1 2/2004 McEvoy et al.
6,688,687 B2 2/2004 Chu
6,688,690 B2 2/2004 Watson et al.
6,688,693 B2 2/2004 Christofferson et al.
6,692,075 B2 2/2004 Sander et al.
6,695,404 B2 2/2004 Brüske
6,695,410 B2 2/2004 Hsia
6,709,057 B2 3/2004 Sander et al.
6,710,244 B1 3/2004 Pferschy
6,722,735 B2 4/2004 Lucci et al.
6,729,688 B2 5/2004 Erne
6,729,691 B2 5/2004 Koepke et al.
6,752,459 B2 6/2004 Deisig
6,755,467 B1 6/2004 Chu
6,755,473 B2 6/2004 Reed et al.
6,779,846 B2 8/2004 Spendlove et al.
6,783,184 B2 8/2004 DiBattista et al.
6,786,544 B1 9/2004 Muraishi

(56) References Cited

U.S. PATENT DOCUMENTS 6,786,548 B2 9/2004 Pearce et al.
6,811,215 B2 11/2004 Horiki et al.
6,811,218 B2 11/2004 Deimen et al.
6,820,388 B2 11/2004 Newhouse et al.
6,820,934 B2 11/2004 Ware et al.
6,820,935 B1 11/2004 Cioncada
D501,333 S 2/2005 Piretti
6,863,346 B2 3/2005 Zünd
6,869,142 B2 3/2005 Heidmann et al.
6,871,909 B2 3/2005 Hobb et al.
6,877,816 B1 4/2005 Farmont
6,880,886 B2 4/2005 Bodnar et al.
6,890,030 B2 5/2005 Wilkerson et al.
6,896,327 B1 5/2005 Barile, Sr.
6,896,328 B2 5/2005 Goodworth
6,896,329 B2 5/2005 Sander et al.
6,908,159 B2 6/2005 Prince et al.
6,929,327 B2 8/2005 Piretti
6,932,430 B2 8/2005 Bedford et al.
6,932,431 B2 8/2005 Koch et al.
6,935,690 B2 8/2005 Lucci et al.
D509,388 S 9/2005 Koepke et al.
6,945,605 B2 9/2005 Kinoshita et al.
D510,668 S 10/2005 Eldøy
6,951,085 B2 10/2005 Hodges et al.
6,957,862 B2 10/2005 Chen
D516,831 S 3/2006 Eldøy
7,029,071 B2 4/2006 Watson et al.
7,048,335 B2 5/2006 Norman et al.
7,066,537 B2 6/2006 Coffield et al.
7,066,538 B2 6/2006 Machael et al.
D525,445 S 7/2006 Liu et al.
D525,446 S 7/2006 Farber
7,070,242 B2 7/2006 Mears et al.
7,097,249 B2 8/2006 Igarashi et al.
7,104,607 B2 * 9/2006 Yasuda ................ B60N 2/2222 297/285
7,108,322 B2 9/2006 Erker
7,118,177 B2 10/2006 Piretti
7,159,943 B2 1/2007 Costaglia
7,185,910 B2 3/2007 Beauchesne et al.
D542,574 S 5/2007 Johnson
D543,399 S 5/2007 Johnson
7,213,886 B2 5/2007 Schmitz et al.
7,226,130 B2 6/2007 Tubergen et al.
7,234,772 B2 6/2007 Wells
7,234,774 B2 6/2007 Heidmann et al.
7,234,775 B2 6/2007 Serber
7,237,841 B2 7/2007 Norman et al.
7,243,997 B1 7/2007 Tornero
7,250,091 B2 7/2007 Gupta et al.
7,262,371 B2 8/2007 Makwinski et al.
7,264,311 B2 9/2007 Heidmann
D551,868 S 10/2007 Chu
D552,368 S 10/2007 Scheper et al.
D553,380 S 10/2007 Natuzzi
7,275,788 B2 10/2007 Dettmann et al.
7,278,688 B1 10/2007 Hung
7,281,764 B2 10/2007 Thole
7,287,815 B2 10/2007 Leguen et al.
D557,025 S 12/2007 Chen
D559,002 S 1/2008 Williams et al.
D560,918 S 2/2008 Fuksas
7,334,845 B2 2/2008 Peterson et al.
7,360,835 B2 4/2008 Tubergen et al.
D571,568 S 6/2008 Overthun et al.
7,408,114 B2 8/2008 VanderVelde et al.
7,416,256 B2 8/2008 Fujita et al.
7,419,215 B2 9/2008 Wilkerson et al.
7,419,222 B2 9/2008 Schmitz et al.
7,429,081 B2 9/2008 Roslund et al.
7,434,880 B2 10/2008 Rønnestad
7,441,839 B2 10/2008 Pennington et al.
7,448,168 B2 11/2008 Waalkes et al.
7,513,570 B2 4/2009 Roslund et al.
D596,871 S 7/2009 Farber
7,568,763 B2 8/2009 Bedford et al.
7,589,286 B2 9/2009 VanderVelde et al.
7,600,814 B2 10/2009 Link
7,600,820 B2 10/2009 Bouche et al.
D604,535 S 11/2009 Parker et al.
7,654,616 B2 2/2010 Kinoshita et al.
D610,824 S 3/2010 Piretti
7,681,952 B2 3/2010 Piretti
7,695,067 B2 4/2010 Goetz et al.
D616,213 S 5/2010 Parker et al.
7,708,349 B2 5/2010 Chen
7,716,797 B2 5/2010 Kismarton et al.
7,717,519 B2 5/2010 Kismarton et al.
7,735,923 B2 6/2010 Roslund et al.
7,753,447 B2 7/2010 Sulzer
7,770,973 B2 8/2010 Gehner et al.
7,784,870 B2 8/2010 Machael et al.
7,798,573 B2 9/2010 Pinnington et al.
7,806,481 B2 10/2010 Eberlein
7,837,265 B2 11/2010 Machael et al.
7,878,598 B2 2/2011 Oda
7,896,439 B2 3/2011 Kan et al.
7,922,248 B2 4/2011 Aldrich et al.
7,926,879 B2 4/2011 Schmitz et al.
7,926,880 B2 4/2011 Heidmann et al.
7,992,936 B2 8/2011 Schmitz et al.
7,997,652 B2 8/2011 Roslund et al.
8,002,351 B2 8/2011 Golynsky
8,025,335 B2 9/2011 Gehner
D646,074 S 10/2011 Cantarutti
8,029,060 B2 10/2011 Parker et al.
8,087,727 B2 1/2012 Parker et al.
8,096,615 B2 1/2012 Parker et al.
8,104,838 B2 1/2012 Tsai
8,162,397 B2 4/2012 Booth et al.
8,172,332 B2 5/2012 Masunaga et al.
8,100,476 B2 6/2012 Jenkins
8,210,611 B2 7/2012 Aldrich et al.
8,215,710 B2 7/2012 Erker
8,235,468 B2 8/2012 Fookes et al.
8,272,693 B2 9/2012 Hall et al.
D669,279 S 10/2012 Eldøy
8,282,169 B2 10/2012 Schmitz et al.
8,282,172 B2 10/2012 Schmitz et al.
8,313,140 B2 11/2012 Niitsuma et al.
D678,690 S 3/2013 Eldøy
8,388,064 B2 3/2013 Bertolini et al.
8,414,073 B2 4/2013 Schmitz et al.
8,419,133 B2 4/2013 Holt et al.
8,419,135 B2 4/2013 Moeseneder et al.
8,449,037 B2 5/2013 Behar et al.
8,459,746 B2 6/2013 Lai
8,469,454 B2 6/2013 Holt et al.
8,480,171 B2 7/2013 Chadwick et al.
8,550,564 B1 10/2013 Kismarton et al.
8,562,073 B2 10/2013 Niitsuma et al.
8,567,864 B2 10/2013 Deisig et al.
8,602,501 B2 12/2013 Walker et al.
8,613,481 B2 12/2013 Parker et al.
8,616,640 B2 12/2013 van Hekken
8,622,474 B2 1/2014 Jenkins
8,668,265 B2 3/2014 Parker et al.
8,668,267 B2 3/2014 Piretti
8,714,645 B2 5/2014 Cvek
8,752,896 B2 6/2014 Takeuchi et al.
8,777,312 B2 7/2014 Diffrient
8,820,835 B2 9/2014 Minino et al.
D714,563 S 10/2014 Amdal et al.
8,888,183 B2 11/2014 Parker et al.
8,960,796 B2 2/2015 Aldrich et al.
8,967,726 B2 3/2015 Schmitz et al.
D727,076 S 4/2015 Usumoto
8,998,337 B2 4/2015 Miyamoto
8,998,338 B2 4/2015 Vander Veen et al.
8,998,339 B2 4/2015 Peterson et al.
9,004,597 B2 4/2015 Battey et al.
9,010,839 B2 4/2015 Schijve et al.
9,033,421 B2 5/2015 Wilkinson et al.

(56) References Cited

U.S. PATENT DOCUMENTS

| | | | |
|---|---|---|---|
| 9,039,093 | B2 | 5/2015 | Nishiura et al. |
| 9,049,936 | B2 | 6/2015 | Leone et al. |
| 9,084,476 | B2 | 7/2015 | Mojtabavi et al. |
| 9,132,760 | B2 | 9/2015 | Matsumoto et al. |
| 9,168,855 | B2 | 10/2015 | Evans et al. |
| 9,211,826 | B2 | 12/2015 | Matsumoto et al. |
| 9,510,684 | B2 | 12/2016 | Schmitz et al. |
| 10,016,060 | B2 | 7/2018 | Schmitz et al. |
| 10,111,525 | B2 | 10/2018 | Sander et al. |
| 2002/0000745 | A1 | 1/2002 | Conte |
| 2002/0041118 | A1 | 4/2002 | Howell |
| 2002/0053822 | A1 | 5/2002 | Ware et al. |
| 2002/0109384 | A1 | 8/2002 | Hansen |
| 2003/0075961 | A1 | 4/2003 | Struppler et al. |
| 2003/0132653 | A1 | 7/2003 | Thole |
| 2003/0137171 | A1 | 7/2003 | Deimen et al. |
| 2003/0189367 | A1 | 10/2003 | Erker |
| 2004/0032156 | A1 | 2/2004 | Stipek |
| 2004/0160109 | A1 | 8/2004 | Bottemiller |
| 2004/0212244 | A1 | 10/2004 | Wu |
| 2004/0217521 | A1 | 11/2004 | DiBattista et al. |
| 2004/0224127 | A1 | 11/2004 | DiBattista et al. |
| 2004/0262977 | A1 | 12/2004 | Dibattista et al. |
| 2005/0035638 | A1 | 2/2005 | Pennington et al. |
| 2005/0116525 | A1 | 6/2005 | Holcomb et al. |
| 2006/0101724 | A1 | 5/2006 | Hoekstra et al. |
| 2006/0181126 | A1 | 8/2006 | Eysing |
| 2006/0255645 | A1 | 11/2006 | Coffield et al. |
| 2007/0007812 | A1 | 1/2007 | Doricko |
| 2007/0057562 | A1 | 3/2007 | Gregory et al. |
| 2007/0126271 | A1 | 6/2007 | Brodeur |
| 2007/0241599 | A1 | 10/2007 | Hodgdon |
| 2007/0262634 | A1 | 11/2007 | Brill et al. |
| 2008/0038505 | A1 | 2/2008 | Salzmann |
| 2008/0067848 | A1 | 3/2008 | Brauning |
| 2008/0122284 | A1 | 5/2008 | Yang |
| 2008/0217977 | A1 | 9/2008 | Aldrich et al. |
| 2008/0264425 | A1 | 10/2008 | Mundell |
| 2009/0042014 | A1 | 2/2009 | Synnestvedt et al. |
| 2009/0091170 | A1 | 4/2009 | Grentzelius et al. |
| 2009/0146476 | A1 | 6/2009 | Kan et al. |
| 2009/0211194 | A1 | 8/2009 | Fyfe et al. |
| 2009/0261644 | A1 | 10/2009 | Piretti |
| 2010/0117419 | A1 | 5/2010 | Schmitz et al. |
| 2010/0119635 | A1 | 5/2010 | Sayers et al. |
| 2010/0289308 | A1 | 11/2010 | Schmitz et al. |
| 2011/0241405 | A1 | 10/2011 | Slagh |
| 2012/0025574 | A1 | 2/2012 | Wilkinson et al. |
| 2012/0091769 | A1 | 4/2012 | Parker et al. |
| 2012/0228911 | A1 | 9/2012 | Piretti |
| 2013/0082499 | A1 | 4/2013 | Schmitz et al. |
| 2013/0099534 | A1 | 4/2013 | Barile, Jr. et al. |
| 2013/0099548 | A1 | 4/2013 | Schmitz et al. |
| 2013/0119744 | A1 | 5/2013 | Panozzo et al. |
| 2013/0134756 | A1 | 5/2013 | Hisamoto |
| 2013/0207427 | A1 | 8/2013 | Masunaga et al. |
| 2013/0278025 | A1 | 10/2013 | Wakabayashi et al. |
| 2014/0077548 | A1 | 3/2014 | Peterson et al. |
| 2014/0077551 | A1 | 3/2014 | Battey et al. |
| 2014/0077573 | A1 | 3/2014 | Schneider et al. |
| 2014/0091608 | A1 | 4/2014 | Schoenenberger |
| 2014/0103688 | A1 | 4/2014 | Wilson |
| 2014/0110983 | A1 | 4/2014 | Sander et al. |
| 2014/0139004 | A1 | 5/2014 | Matsumoto et al. |
| 2014/0152064 | A1 | 6/2014 | Sander et al. |
| 2014/0175849 | A1 | 6/2014 | Berti et al. |
| 2014/0183915 | A1 | 7/2014 | Deisig et al. |
| 2014/0354026 | A1 | 12/2014 | Gorgi |
| 2015/0044419 | A1 | 2/2015 | Carson, Jr. et al. |
| 2015/0091353 | A1 | 4/2015 | Horn |
| 2015/0130254 | A1 | 4/2015 | Yamaguchi et al. |
| 2015/0216308 | A1 | 8/2015 | Wilkinson et al. |
| 2015/0238016 | A1 | 8/2015 | Schmitz et al. |
| 2015/0314501 | A1 | 11/2015 | Maslakow |
| 2015/0343747 | A1 | 12/2015 | Meermann et al. |
| 2016/0296026 | A1 | 10/2016 | Ludwig et al. |

FOREIGN PATENT DOCUMENTS

| | | | |
|---|---|---|---|
| DE | 3735256 | A1 | 4/1989 |
| DE | 4121768 | C1 | 10/1992 |
| DE | 4303021 | A1 | 8/1994 |
| DE | 4424096 | A1 | 1/1996 |
| DE | 29517458 | | 2/1996 |
| DE | 4433663 | A1 | 3/1996 |
| DE | 4442246 | A1 | 5/1996 |
| DE | 29704906 | U1 | 7/1997 |
| DE | 19611345 | A1 | 9/1997 |
| DE | 19620260 | A1 | 11/1997 |
| DE | 19714546 | A1 | 10/1998 |
| DE | 19916411 | A1 | 11/2000 |
| DE | 102005054125 | B3 | 5/2007 |
| DE | 202007010030 | U1 | 9/2007 |
| DE | 102009019232 | | 11/2009 |
| DE | 102013205784 | A1 | 10/2014 |
| DE | 102013022122 | A1 | 7/2015 |
| DE | 102016005387 | B3 | 2/2017 |
| EP | 0081102 | A1 | 6/1983 |
| EP | 0107627 | A1 | 5/1984 |
| EP | 0151816 | A2 | 8/1985 |
| EP | 0202386 | A2 | 11/1986 |
| EP | 0552388 | A1 | 7/1993 |
| EP | 0559185 | A1 | 9/1993 |
| EP | 0678260 | A1 | 10/1995 |
| EP | 0860355 | A1 | 8/1998 |
| EP | 0870443 | A2 | 10/1998 |
| EP | 0897682 | A1 | 2/1999 |
| EP | 0982179 | A2 | 3/2000 |
| EP | 0982180 | A1 | 3/2000 |
| EP | 1040999 | A2 | 10/2000 |
| EP | 1316651 | A2 | 6/2003 |
| EP | 1721732 | A1 | 11/2006 |
| EP | 1854378 | A1 | 11/2007 |
| EP | 2070443 | | 12/2007 |
| EP | 1886798 | A2 | 2/2008 |
| EP | 1897747 | A1 | 3/2008 |
| EP | 2110050 | A1 | 10/2009 |
| EP | 2110051 | A1 | 10/2009 |
| EP | 2110052 | A2 | 10/2009 |
| EP | 2070446 | B1 | 5/2011 |
| EP | 2335527 | A1 | 6/2011 |
| EP | 2765026 | A1 | 8/2014 |
| FR | 2233799 | | 6/1973 |
| FR | 2715124 | A1 | 7/1995 |
| JP | 1099158 | A | 4/1998 |
| JP | 2013132403 | A | 7/2013 |
| JP | 2015177979 | A | 10/2015 |
| WO | 9515101 | | 6/1995 |
| WO | 9629912 | | 10/1996 |

* cited by examiner

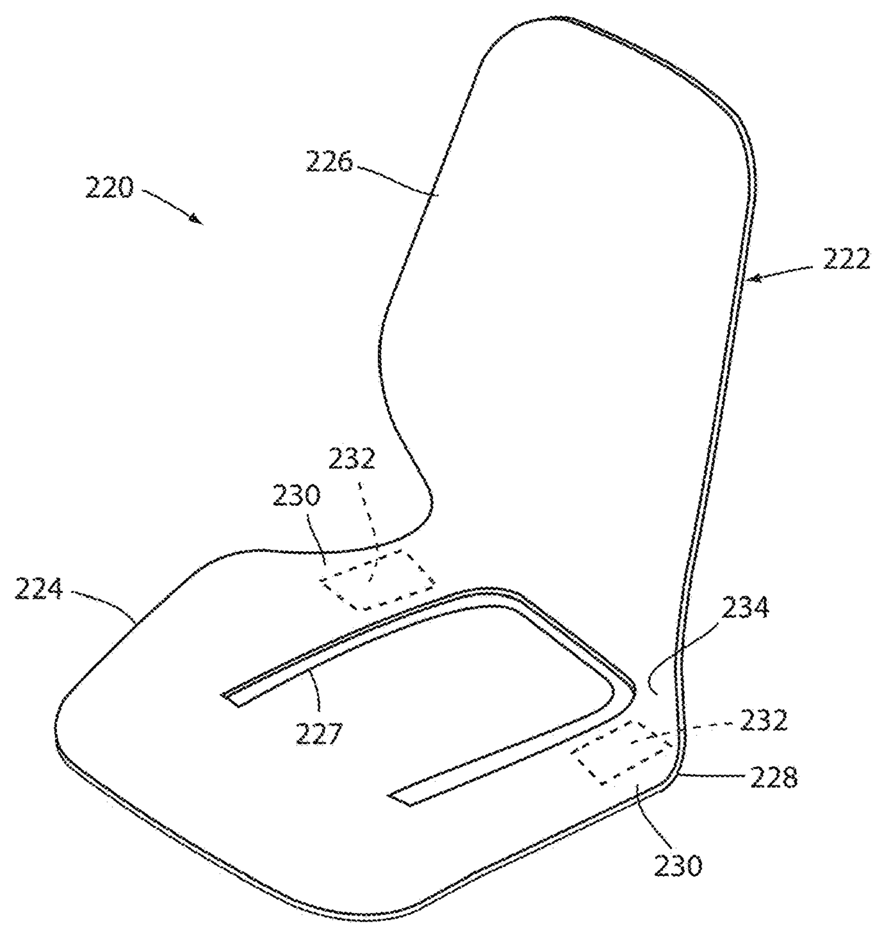
FIG. 16
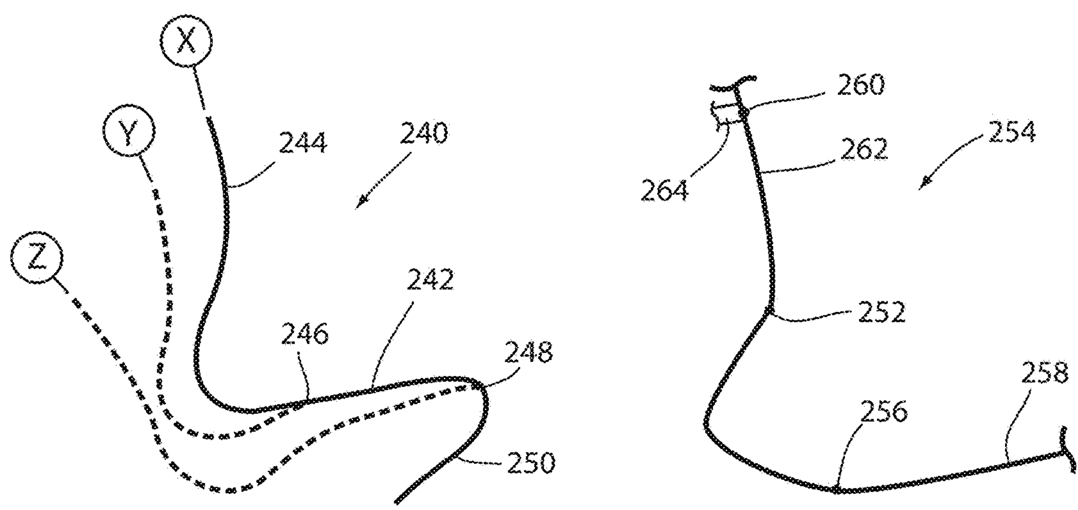
FIG. 17
FIG. 18

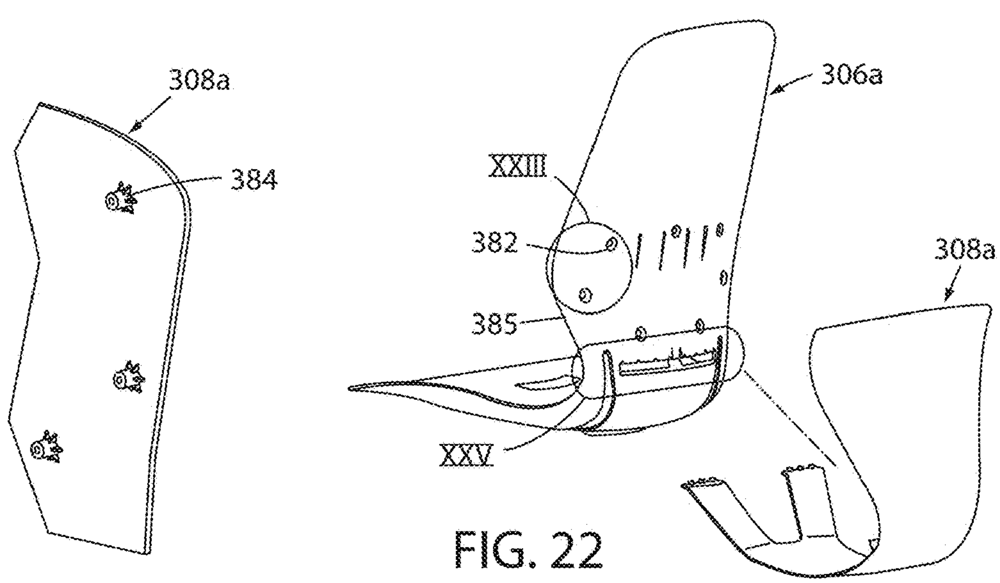
FIG. 21
FIG. 22
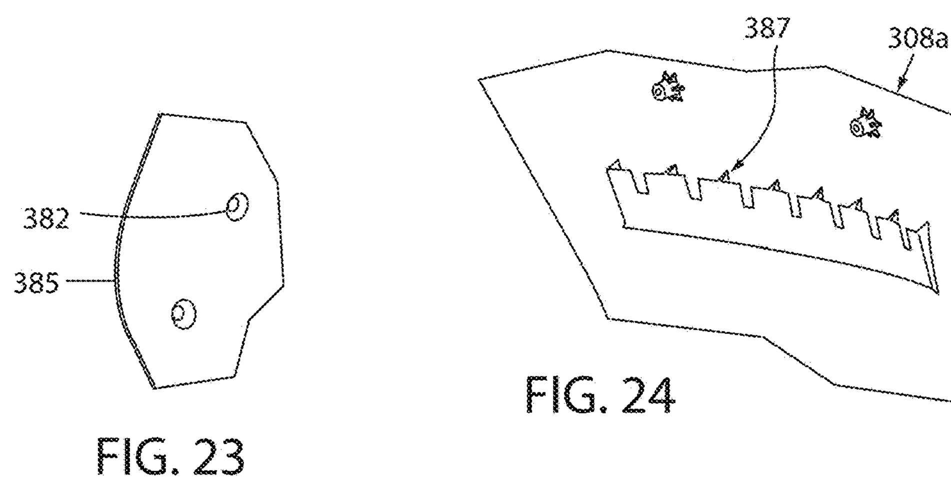
FIG. 23
FIG. 24
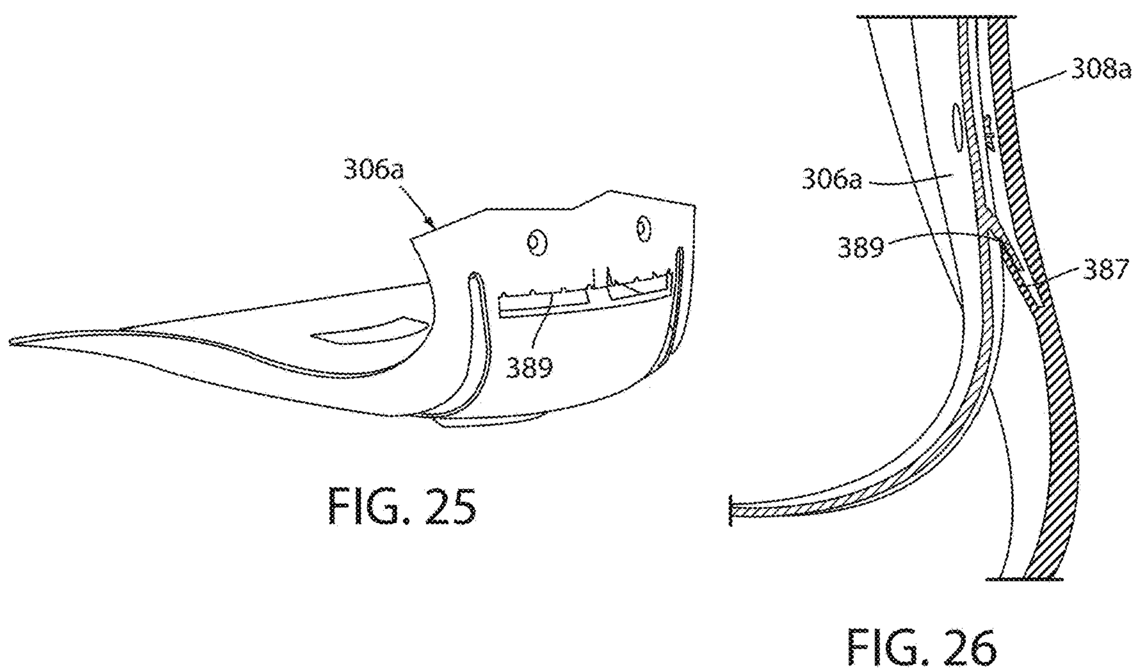
FIG. 25
FIG. 26

SEATING ARRANGEMENT AND METHOD OF CONSTRUCTION

CROSS REFERENCE TO RELATED APPLICATIONS

This application is a continuation of U.S. patent application Ser. No. 15/997,128, filed on Jun. 4, 2018, entitled "SEATING ARRANGEMENT AND METHOD OF CONSTRUCTION," which claims benefit of U.S. Provisional Patent Application No. 62/517,270, filed on Jun. 9, 2017, entitled "SEATING ARRANGEMENT AND METHOD OF CONSTRUCTION," and U.S. Provisional Patent Application No. 62/653,275, filed on Apr. 5, 2018, entitled "SEATING ARRANGEMENT AND METHOD OF CONSTRUCTION," the entire disclosures of which are incorporated herein by reference.

TECHNICAL FIELD

Various embodiments relate to a seating arrangement, and in particular to a seating arrangement that includes various combinations of a pair of flexibly resilient shell members, a flexibly resilient support member and a rigid support member that cooperate to form a deformable and flexibly resilient four-bar linkage, and an active back arrangement having a movement that may be separated from movement of an associated seat support arrangement.

BRIEF SUMMARY

In one embodiment, a seating arrangement includes a base member, and an integrally formed support member coupled to the base member and supporting a seat moveable from an upright position to a reclined position, wherein a portion of the support member is bendable as the seat moves from the upright position to the reclined position such that a first side of the support member is put in tension and a second side generally opposite the first side is put in compression, and wherein the first side includes a tensile substrate so that the first side has a higher modulus of elasticity than the second side.

In another embodiment, a seating arrangement includes a first portion of a seating component, a second portion of the seating component movable with respect to the first portion between a first position and a second position, and a transition portion of the seating component positioned between and integral with the first and second portions and configured to deform as the second portion is moved between the first and second position, the transition portion including a side in tension as the transition portion is deformed, a side under compression as the transition portion is deformed and a plurality of longitudinally-aligned strands where a majority of the plurality of strands of the transition portion are positioned in the side in tension, wherein the plurality of strands bias the second portion from the second position toward the first position.

In yet another embodiment, a seating arrangement includes a first portion of a seating component, a second portion of the seating component movable with respect to the first portion between a first position and a second position and a transition portion of the seating component positioned between and integral with the first and second portions and configured to deform as the second portion is moved between the first and second position, the transition portion including a first side, a second side located opposite the first side, a first material have a first modulus of elasticity, and second material having a second modulus elasticity that is greater than the first modulus of elasticity, wherein a majority of the second material is located in the first side of the transition portion, and wherein the second material biases the second portion from the second portion toward the first position.

In still yet another embodiment, a seating arrangement includes a first portion of a seating component, a second portion of the seating component movable with respect to the first portion between a first position and a second position, and a transition portion of the seating component positioned between the first and second portions and configured to deform as the second portion is moved between the first and second position, the transition portion including a first material and second material that is different than the first material, the first material comprising a thermoplastic, wherein the transition portion has a modulus of elasticity of within the range of from about 700,000 psi to about 5,000,000 psi, and wherein the second material biases the second portion from the second position toward the first position.

In another embodiment, a seating arrangement includes a seating surface configured to support a seated user, a back member extending upward substantially upward from the seating surface and movable between an upright position and a reclined position, and a supporting arrangement. The supporting arrangement includes a first portion, a second portion movable with respect to the first portion between a first position and a second position and a third portion between the first portion and the second portion and that is configured to deform as the second portion is moved between the first and second positions, the third portion including a side in tension as the third portion is deformed and a side under compression as the third portion is deformed, wherein the third portion of the supporting arrangement includes a first material having a first modulus of elasticity and second material having a second modulus of elasticity that is greater than the first modulus of elasticity, a majority of second material being positioned in the side in tension of the third portion.

In yet another embodiment, a seating arrangement subassembly for use in making a chair component includes first and second sections each including a plurality of longitudinally-aligned strands, and a tape carrier molded to the first and second sections, wherein at least portions of the first and second sections are exposed from the tape carrier and the exposed portions are spaced in different planes.

In yet another embodiment, a seating arrangement includes a base member, and an integrally formed support member coupled to the base member and supporting a seat moveable from an upright position to a reclined position, wherein a first portion of the support member positioned rearwardly of the base member is bendable such that an upper layer of the first portion is put in tension, and wherein a second portion of the support member positioned forwardly of the base member is bendable such that a lower layer of the second portion is put in tension, wherein the upper layer of the first portion and the lower layer of the second portion are reinforced with at least one tensile substrate.

In still yet another embodiment, a seating arrangement includes a first portion, a second portion and a third portion, the second and third portions movable with respect to the first portion between respective first and second positions, and a first transition portion positioned between the first and second portions and a second transition portion positioned between the first and third portions, the first, second, third, first transition and second transition portions being an integral, single piece, the first and second transition portions configured to deform as the second and third portions are moved between the first and second positions, respectively, the transition portions each including a side in tension as the respective transition portion is deformed, a side under compression as the respective transition portion is deformed and a plurality of longitudinally-aligned strands where a majority of the plurality of strands of each transition portion are positioned in the side in tension of that transition portion, wherein the plurality of strands bias the second and third portions from the second position toward the first position thereof, wherein the first, second, third, first transition and second transition portions cooperate to form a first side and a second side that is opposite the first side, and wherein the side in tension of the first transition portion is located in the first side and the side in tension of the second transition portion is located in the second side.

In still yet another embodiment, a chair shell arrangement includes a seating portion, a curved transition portion and a backrest portion, wherein a pair of laterally spaced longitudinal slots are formed in portions of the seating portion and the transition portion thereby defining a central region and laterally spaced side regions, wherein the central region is moveable relative to the side regions during recline of the chair, and an over molded layer covering the pair of slots.

In another embodiment, a seating arrangement includes a first portion of a seating component, a second portion of a seating component moveable with respect to the first portion between a first position and second position, a transition portion of a seating component positioned between the first portion and the second portion, where the transition portion is configured to deform as the second portion is moved from the first position to the second position, the transition portion including a surface in tension as the transition portion is deformed and a surface under compression as the transition portion is deformed, and a stranded material attached to the surface in tension of the transition area.

In yet another embodiment, a flexible hinge arrangement includes a first portion, a second portion movable with respect to the first portion between a first position and a second position, and a transition portion positioned between the first and second portions and configured to deform as the second portion is moved between the first and second position, the transition portion including a side in tension as the transition portion is deformed, a side under compression as the transition portion is deformed and a plurality of longitudinally-aligned strands where a majority of the plurality strands of the transition portion are positioned in the side in tension, wherein the first, second and transition portions are a single, integral piece, and wherein the plurality of strands bias the second portion from the second position toward the first position.

In still yet another embodiment, a flexible hinge arrangement includes a first portion, a second portion and a third portion, the second and third portions movable with respect to the first portion between respective first and second positions, and a first transition portion positioned between the first and second portions and a second transition portion positioned between the first and third portions, the first, second, third, first transition and second transition portions being an integral, single piece, the first and second transition portions configured to deform as the second and third portions are moved between the first and second positions, respectively, the transition portions each including a side in tension as the respective transition portion is deformed, a side under compression as the respective transition portion is deformed and a plurality of longitudinally-aligned strands where a majority of the plurality of strands of each transition portion are positioned in the side in tension of the transition portion, wherein the plurality of strands bias the second and third portions from the second position toward the first position thereof, wherein the first, second, third, first transition and second transition portion cooperate to form a first side and a second side that is opposite the first side, and wherein the side in tension of the first transition portion is located in the first side and the side in tension of the second transition portion is located in the second side.

Another embodiment includes a method of making a reinforced chair component that includes positioning a tape carrier having exposed first and second sections of glass fiber tape in a mold in a manner such that the first and second sections of tape are spaced apart in different planes within the mold, and molding a shell over the tape carrier and first and second sections of tape, wherein the first section of tape is positioned adjacent an upper surface of the shell and the second section of tape is positioned adjacent a lower surface of the shell relative to the chair component.

Yet another embodiment includes a method of constructing a seating arrangement including providing a first material comprising a plurality of strands extending lengthwise with respect to one another, placing the first material in a mold, and molding a second material to the first material to form a seating component having a first portion, a second portion, and a deformable transition portion positioned between the first and second portions, a side in tension as the transition portion is deformed and a side under compression as the transition portion is deformed, wherein a majority of the strands are positioned in the side in tension.

Still yet another embodiment includes a method of constructing a seating arrangement including providing a first material comprising a plurality of strands, placing the first material in a mold, and molding a second material to the first material to form a seating component a tensile side and a compression side, wherein a majority of the strands are positioned in the tensile side.

Still yet another embodiment includes a method of constructing a seating arrangement including providing an insert member that includes as first material and a plurality of strands extending lengthwise with respect to one another, the insert member having a first modulus of elasticity, placing the insert member in a mold, and molding an outer body about at least a portion of the insert member such that at least of majority of the insert is positioned in a tensile side of the outer body than a compression side of the outer body, the outer body comprising a second material having a second modulus of elasticity that is less than the first modulus of elasticity.

Another embodiment includes a method of making a reinforced chair component including positioning a first section of glass fiber tape on a first side of a mold, positioning a second section of glass fiber tape on a second side of the mold such that the two sections of tape are at least partially spaced apart from one another within the mold, and injecting a polymeric material into the mold over the first and second sections of tape to mold the component, wherein the first section of tape is positioned adjacent a first surface of the component and the second section of tape is positioned adjacent a separate surface of the component at least partially spaced apart from one another in the molded component.

Yet another embodiment includes a method of making a chair component including molding a shell having a seating portion, a curved transition portion and a backrest portion, molding a pair of laterally spaced longitudinal slots in portions of the seating portion and the transition portion thereby defining a central region and laterally spaced side regions in the shell, and overmolding a material on the seating portion and transition portion and covering the slots.

Yet another embodiment includes a method of constructing a seating arrangement including providing a first material comprising a plurality of strands extending lengthwise with respect to one another, providing a second material comprising a plurality of strands extending lengthwise with respect to one another, placing the first and second materials in a mold such that the first and second materials are at least partially offset from one another, and molding a third material to the first material to form a seating component having a first side and a second side, wherein a majority of the plurality of strands of the first material are positioned in the first side of the seating component and a majority of the plurality of strands of the second material are position in the second side of the seating component, and such that the first and second material are at least partially offset from one another.

In yet another embodiment, a seating arrangement includes a seat portion configured to support a seated user, a back portion extending substantially upward from the seat portion and movable with respect to the portion between an upright position and a reclined position, and a biasing member that is separate from the seat portion and the back portion and that includes a stranded material and a side in tension and a side in compression as the back portion is moved from the upright position toward the reclined position, wherein the stranded material includes a plurality of longitudinally-extending strands, wherein a majority of the plurality of strands are located within the first side, and wherein the biasing member biases the back portion from the reclined position to the upright position.

In another embodiment, a seating arrangement includes an upwardly extending back arrangement movable between an upright position and reclined position, and a seat arrangement, that includes a first link member extending substantially horizontally and configured to support a seated user thereon, a second link member space from the first link member, and a third link member operably coupled to the first link member and to the second link member. The third link member is substantially flexible along at least a portion of a length thereof, and flexes as the back arrangement moves between the upright and the reclined positions, and is configured to bias the back arrangement from the reclined position toward the upright position. The third link comprises a first material having a first bend stiffness and a second material having a second bend stiffness that is greater the first bend stiffness.

In another embodiment, a seating arrangement includes an upwardly extending back arrangement movable between an upright position and reclined position, and a seat arrangement, that includes a first link member extending substantially horizontally and configured to support a seated user thereon, a second link member space from the first link member, and a third link member operably coupled to the first link member and to the second link member, the third link member being substantially flexible along at least a portion of a length thereof, wherein the third link flexes as the back arrangement moves between the upright and the reclined positions and is configured to bias the back arrangement from the reclined position toward the upright position, wherein the third link includes a body portion having a first bend stiffness and a reinforcement member having a second bend stiffness that is greater that the first bend stiffness, the body portion including a thermoplastic, and the reinforcement member including a stranded material configured to bond to the thermoplastic of the first material.

Another embodiment includes a method of constructing a seating arrangement that includes providing at least one reinforcement member comprising a first material having a first bend stiffness, placing a reinforcement member in a first mold, molding at least one structural seat element to the reinforcement member such that the reinforcement member and the at least one structural seat element cooperate to form a single-piece insert member, removing the insert member from the first mold, placing the insert member in a second mold, and molding an outer body about at least a portion of the insert member, the outer body comprising a second material having a second bend stiffness that is less than the first bend stiffness, wherein at least a portion of the outer body and at least a portion of the insert member are configured as a link that flexes as a back arrangement of a seating arrangement moves between an upright position and a reclined position and is configured to bias the back arrangement from the reclined position toward the upright position.

Various embodiments of the seating arrangements described here may provide a platform with the proper fit and function for comfortably supporting a seated user and may reduce or shift costs by reducing associated part counts, manufacturing costs, and labor costs. The seating arrangement includes an uncomplicated, durable, and visually appealing design capable of a long operating life by reducing part wear associated with more complex designs, allows increased precision during manufacture and assembly, may reduce noise associated with the operation of more complex systems, includes the ability to store useful energy during operation of the overall system, allows for a relative reduction in weight of the associated system, and is particularly well adapted for the proposed use. Further the apparatus and methods as described herein provide a compliant, resiliently flexible arrangement that may be configured as a relatively complex geometry at a relatively low cost, and/or may significantly reduce the complexity required via mechanical-type arrangements.

These and other features, advantages, and objects of various embodiments will be further understood and appreciated by those skilled in the art by reference to the following specification, claims, and appended drawings.

BRIEF DESCRIPTION OF THE DRAWINGS

FIG. 7;

FIG. 16 is a perspective view of a non-weight activated seat structure;

FIG. 17 is a side-elevational schematic view of a seat shell member;

FIG. 18 is a side-elevational schematic view of another embodiment of a seat shell member;

FIG. 21 is an enlarged view of area XXI, FIG. 20;

FIG. 22 is a rear perspective view of a front shell member and a rear shell member;

FIG. 23 is an enlarged view of area XXIII, FIG. 22;

FIG. 24 is an enlarged view of area XXIV, FIG. 20;

FIG. 25 is an enlarged view of area XXV, FIG. 22;

FIG. 26 is a cross-sectional view of the front and rear shell members engaged with one another;

DETAILED DESCRIPTION OF THE PREFERRED EMBODIMENTS

Figure 1:
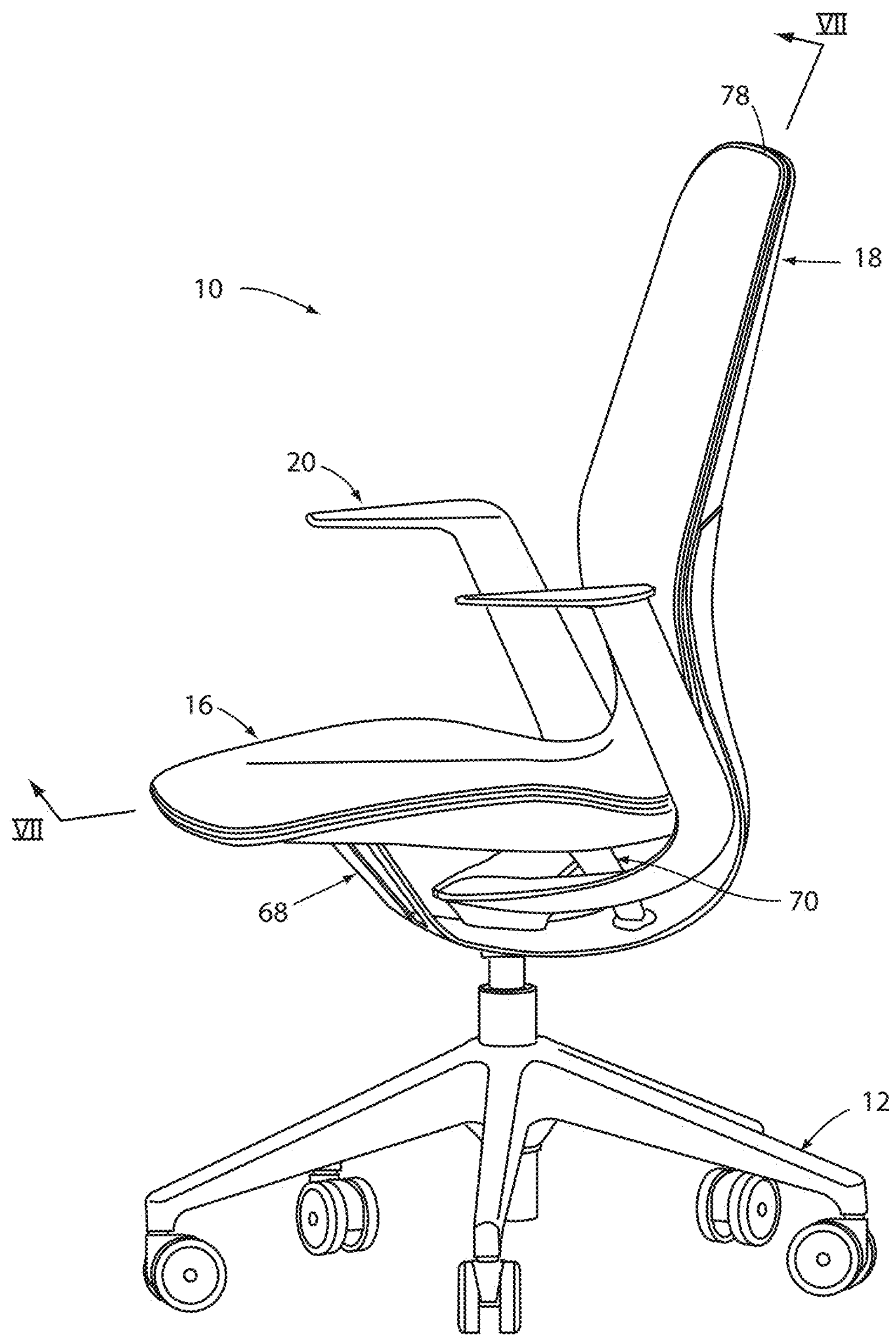
FIG. 1 is a perspective view of an embodiment of a seating arrangement.

For purposes of description herein, the terms “upper,” “lower,” “rear,” “front,” “vertical,” “horizontal,” and derivatives thereof shall relate to the various seating embodiments as oriented in FIG. 1. However, it is to be understood that certain embodiments may assume various alternative orientations and step sequences, except where expressly specified to the contrary. It is also to be understood that the specific devices and processes illustrated in the attached drawings, and described in the following specification are exemplary embodiments of the concepts defined in the appended claims. Hence, specific dimensions and other physical characteristics relating to the embodiments disclosed herein are not to be considered as limiting, unless the claims expressly state otherwise. The various embodiments disclosed herein may be utilized within and incorporated into various seating arrangements, including office chairs, general office seating, vehicle seating, home seating, aircraft seating, stadium seating, theater seating, and the like.

Figure 2:
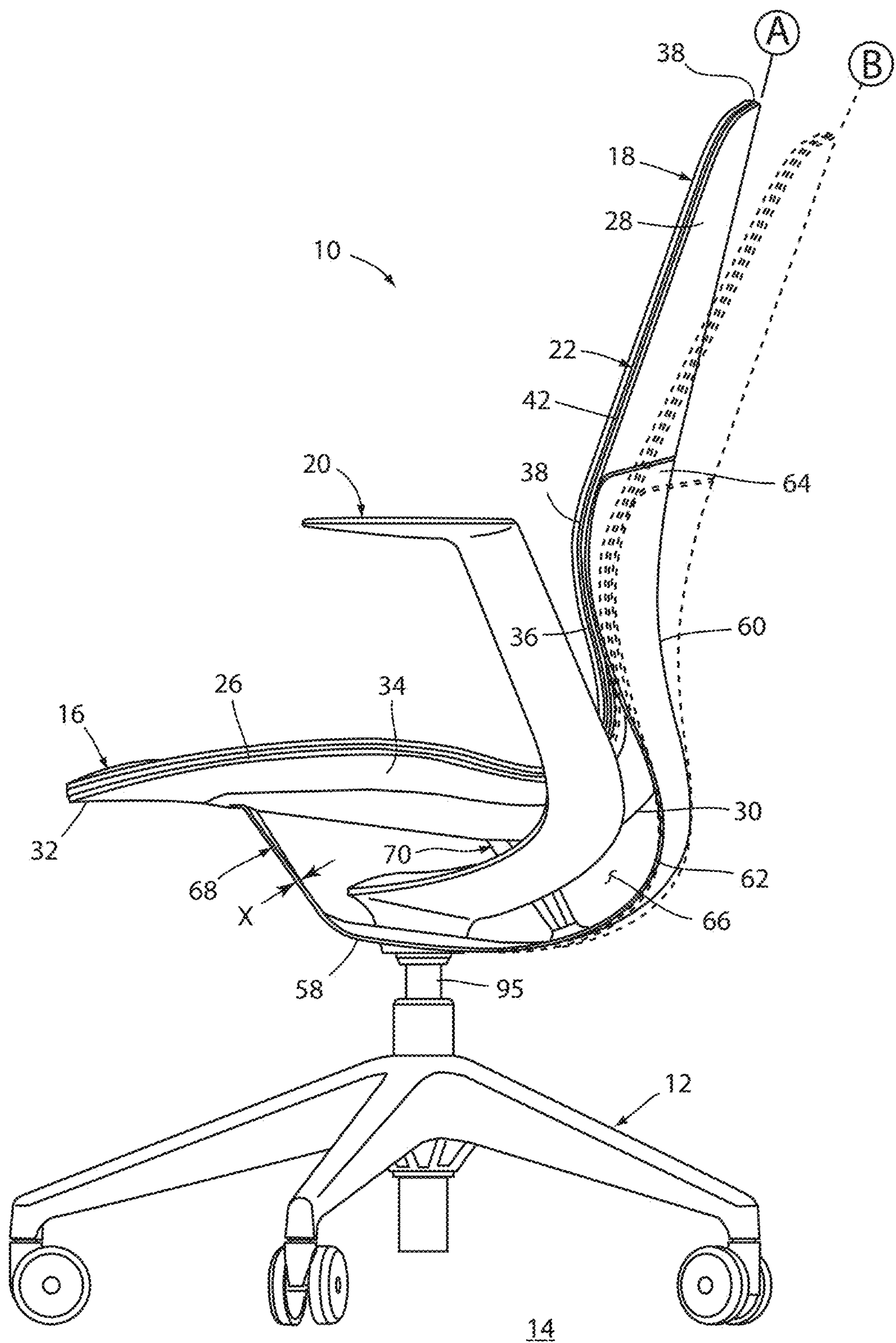
FIG. 2 is a side elevational view of the embodiment of the seating arrangement shown in FIG. 1 with a back assembly shown in an upright position in solid line and a reclined position in dashed line.

The reference numeral 10 (FIG. 1) generally designates an embodiment of a seating arrangement. In the illustrated example, the seating arrangement 10 is provided in the form of an office chair assembly and includes a cantered base assembly 12 abutting a floor surface 14, a seat assembly 16 and a back assembly 18 each supported above the base assembly 12, and a pair of arm assemblies 20. In the illustrated example, the chair assembly 10 (FIG. 2) includes a front or a first shell member 22 and a rear or second shell member 24. The shell members 22, 24 may each be formed as a single, integral piece or comprise multiple, individual components as described below. The shell members 22, 24 may each comprise a flexibly resilient polymer material such as any thermoplastic, including, for example, nylon, glass-filled nylon, polypropylene, acetyl, or polycarbonate; any thermal set material, including, for example, epoxies; or any resin-based composites, including, for example, carbon fiber or fiberglass, thereby allowing each of the shell members 22, 24 to conform and move in response to forces exerted by a user. Although a polymer material is preferred, other suitable materials may also be utilized, such as metals, including, for example, steel or titanium; plywood; or a composite material including plastics, resin-based composites, metals and/or plywood. A variety of other suitable energy-storing materials may also be utilized.

Figure 3:
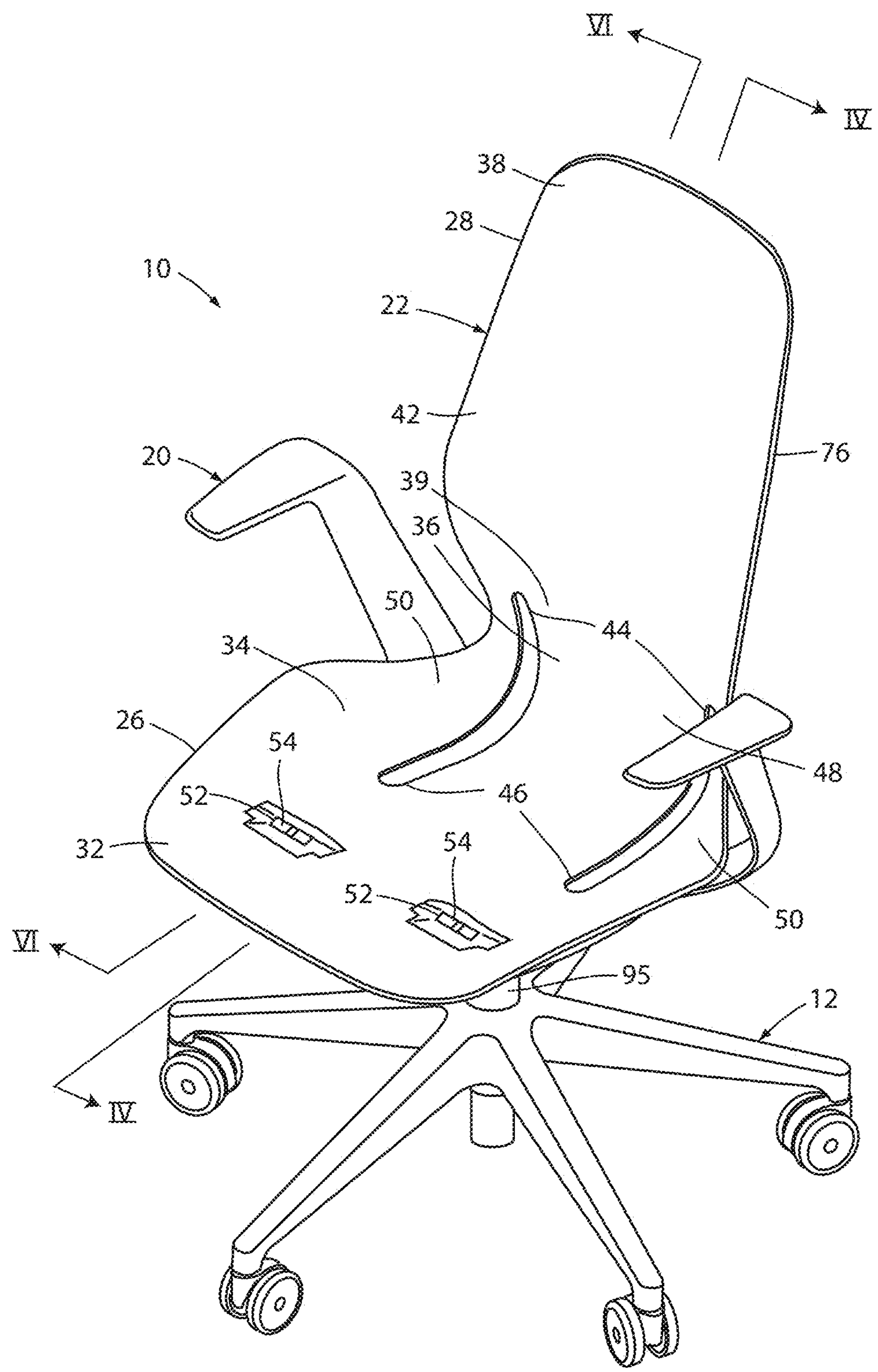
FIG. 3 is a perspective view of the embodiment of the chair shown in FIG. 1 with a fabric cover removed.

The front shell member 22 (FIGS. 2 and 3) includes a horizontally-extending bottom or first portion 26 which may be configured to support a seated user, a vertically-extending upper or second portion 28 extending upwardly from the first portion 26 and which may be configured to support the back of a seated user, and an arcuately-shaped transition portion 30 extending between the first portion 26 and the second portion 28. The first portion 26 includes a forward portion 32 and a rearward portion 34, while the second portion 28 includes a lower portion 36, an upper portion 38 where the arcuately-shaped, forwardly convex mid-portion 30 is located therebetween and configured to support the lumbar region of a user’s back.

In the illustrated example, the front shell member 22 further includes a pair of laterally-spaced slots 44 extending in a fore-to-aft direction from a mid-portion 39 of the second portion 28 to the intermediate portion 42 of the second portion 28, thereby dividing the front shell member 22 into an inner portion 48 and a pair of outer portions 50. The division of the inner portion 48 from the outer portions 50 allows the inner portion 48 to flex separately from the outer portions 50 during recline of the back assembly 18 from an upright position A to a recline position B. As best illustrated in the FIGS. 4 and 5, the flexing of the front shell member 22 during recline is such that the inner portion 48 flexes less than the outer portions 50 such that the outer portions 50 descend relative to the inner portion 48, thereby allowing additional flexibility in the front shell member 22 while providing adequate support for the seated user via the inner portion 48. The differentiation of flexure of the inner portion 48 and the outer portions 50 causes the second portion 28 of the front shell member 22 to move from the reclined position toward the upright position and exert an increased pressure to the back of a seated user as the force exerted on the inner portion 48 is increased, such as a force exerted by the weight of a seated user.

Figure 6:
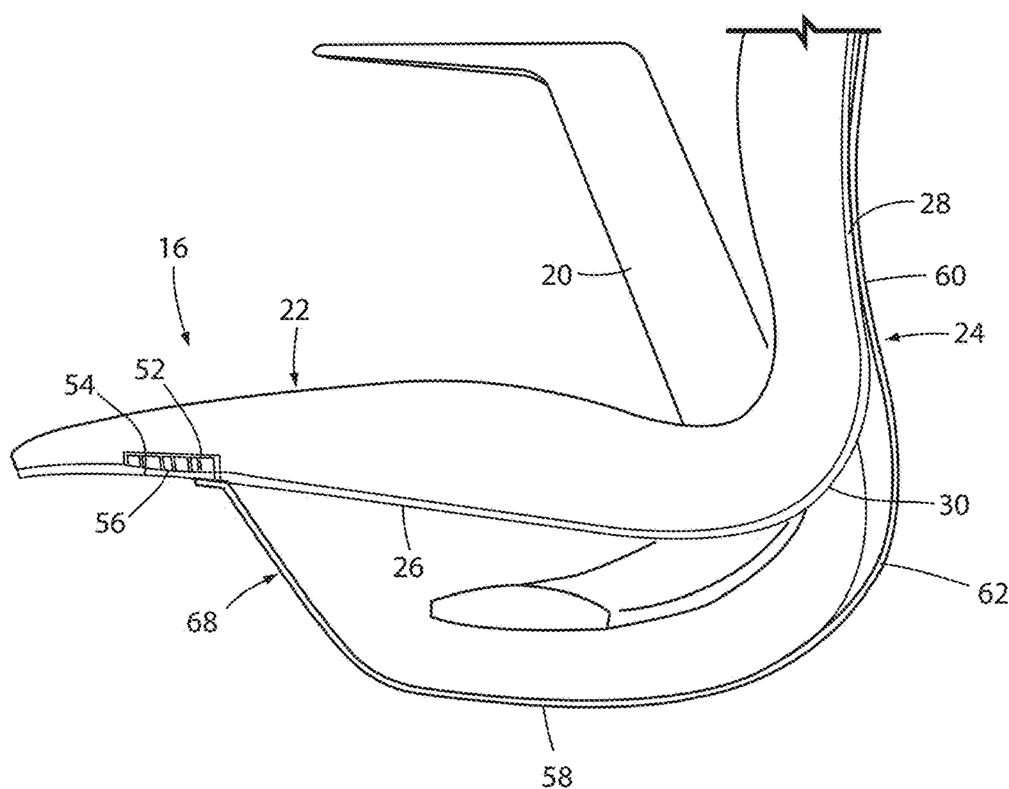
FIG. 6 is a cross-sectional side elevational view of the embodiment of the chair shown in FIG. 1, taken along the line VI-VI, FIG. 3.

The front shell member 22 (FIGS. 3 and 6) further includes a pair of C-shaped reliefs or apertures 52 each defining a tab 54. Each tab 54 has a laterally-extending flexing region 56 of relatively reduced thickness thereby promoting flexure of each tab 54 in this region as described below The rear shell member 24 includes a horizontally-extending bottom or first portion 58, a vertically-extending upper or second portion 60 extending upwardly from the first portion 58, and an arcuately-shaped transition portion 62 extending between the first portion 58 and the second portion 60, and as described in greater detail below.

In assembly, an intermediate portion 42 of the second portion 28 of the front shell member 22 located between the upper portion 38 and the mid-portion 39 is connected to an upper portion 64 of the second portion 60 of the rear shell member 24, such as by sonic welding, an adhesive, integral molding, mechanical fasteners, and the like. The front shell member 22 and the rear shell member 24 may be configured so as to define a gap 66 therebetween.

The chair assembly 10 (FIGS. 1 and 2) may include laterally-extending support members or linkage members, including a pair of forward support or linkage members 68 and a rearward support or linkage member 70, each extending between the second portion 28 of the front shell member 22 and the second portion 58 of the rear shell member 24. In the illustrated example, the forward support members 68 are flexibly resilient along the length thereof, while the rearward support member 70 is relatively rigid. The forward support members 68 are integrally formed with the rear shell member 24 and rigidly attached to the tabs 54 of the front shell member 22, while the rearward support member 70 is integrated with the rear shell member 24 and rigidly attached to the front shell member 22. It is noted that in the other embodiments the front support member 68 and the rearward support member 70 may be formed as separate pieces, or as integral portions of the front shell member 22 and/or the rear shell member 24. Further, in the illustrated example, the inner portion 48 cooperates with the forward support member 68 and the rearward support member 70 to form a control mechanism that synchronizes the rearward movement of the first portion 26 of the front shell member 22 with reclining movement of the second portion 28 of the front shell member 22 as further described below.

Figure 4:
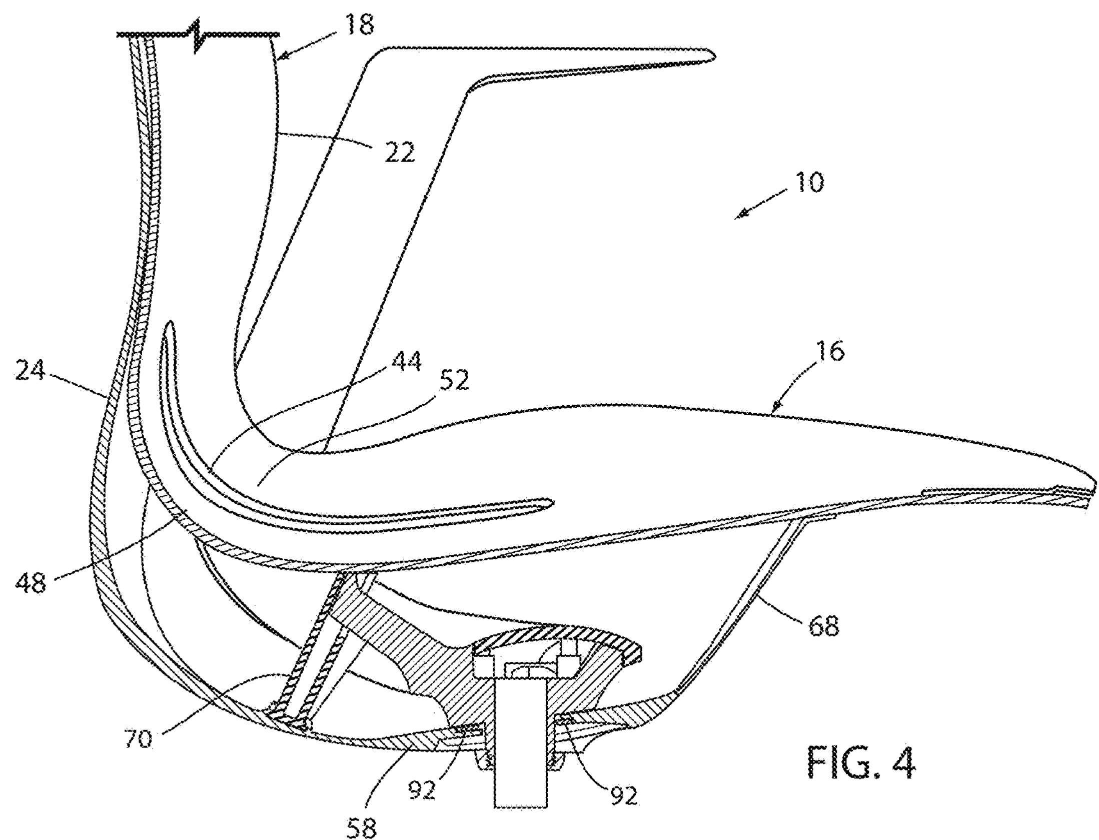
FIG. 4 is a cross-sectional side elevational view of the embodiment of the chair shown in FIG. 1, taken along the line IV-IV, FIG. 3 with the back assembly shown in the upright position.
Figure 5:
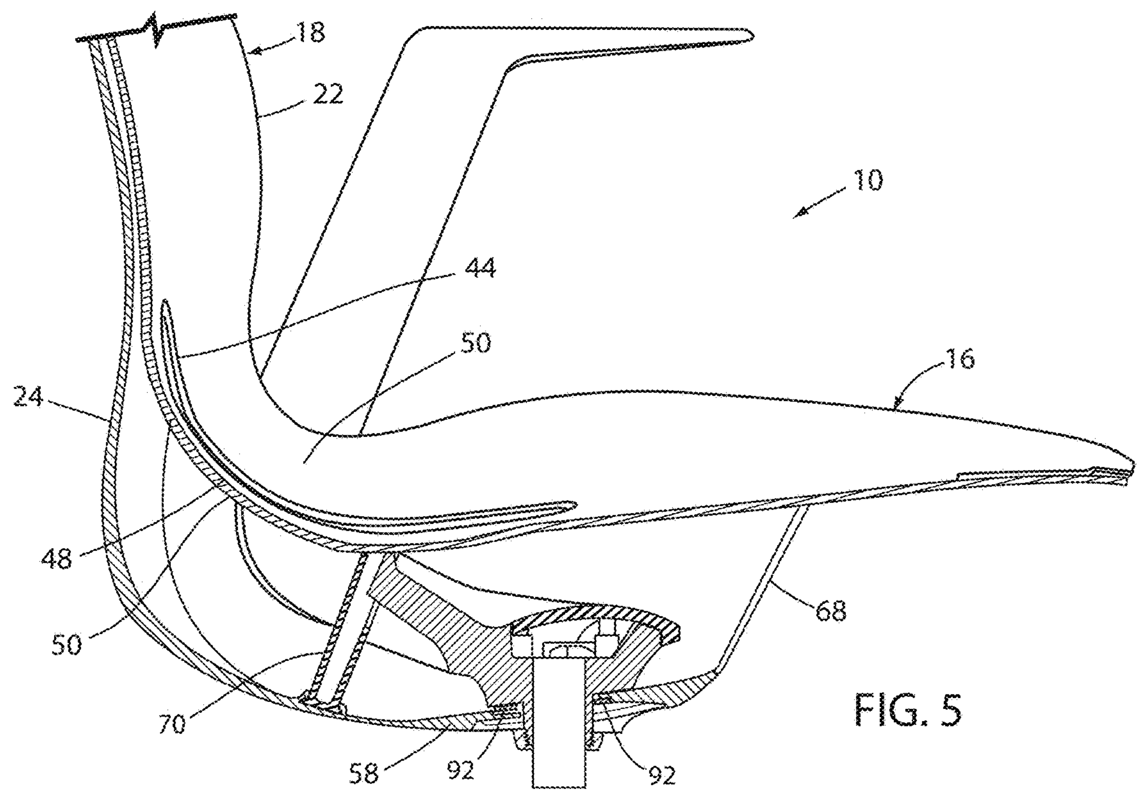
FIG. 5 is a cross-sectional side elevational view of the embodiment of the chair shown in FIG. 1, taken along the line IV-IV, FIG. 3. with the back assembly shown in the recline position.

In the present example, the first portion 58 (FIGS. 6 and 7) of the rear shell member 24 includes a laterally-extending flexing region 72 of relatively reduced thickness located fore of the attachment location of the rearward support member 70 with the rear shell member 24. The forward support member 68 includes a laterally-extending flexing region 74 of relatively reduced thickness located at a lower end of the forward support member 68 such that flexure of the forward support member 68 is concentrated in the flexing region 74 while the remainder of the forward support member 68 may be relatively rigid and may remain relatively straight. The forward support member 68 connects to each of the tabs 54 aft of the flexing region 56. Referring to FIGS. 4 and 5, it is noted that the rearward support member 70 remains rigid during recline, while the second portion 28, the second portion 58 and the forward support member 68 flex, with the flexing regions or flexing zones 56, 72, 74 flexing a greater amount than the remainder of each of the associated components. It is noted that while the present examples are described as including flexible zones that comprise reduced thickness, other configurations may also be used, such as flexible zones created via the use of apertures, cut-outs, reduced widths and general configurations where the bending stiffness of the structure is reduced relative to the remainder of the structure. As previously noted the various thicknesses of the linkages or members comprising the overall supporting flexible four-bar linkage may be varied so as to provide specific support and bending characteristics previously described. The configuration as described above provides adequate flexure to the front shell member 22 while allowing an outer perimeter edge 76 of the front shell member to remain continuous and without breaks or reliefs, thereby providing a continuous outer aesthetic edge, while simultaneously reducing or eliminating wear of a supported cover assembly 78 (FIGS. 1 and 7) typically caused by repeated flexing of a supporting chair surface. In the illustrated example, the cover assembly 78 includes a flexible resilient substrate layer 80 supported by the front shell member 22, a thermal plastic foam layer 82 molded to the substrate layer 80, and a fabric cover 84 thermally set to the foam layer 82. Alternatively, the fabric cover may be wrapped about the foam layer 82 and secured to an underside of the substrate layer 80 by separate mechanical fasteners such as staples (not shown) or to integral fasteners (not shown) integrally molded with the substrate layer 80, and/or secured about the foam layer 82 and the substrate layer 80 by a drawstring arrangement (not shown). In the illustrated example, the foam layer 82 and the fabric cover 84 are both continuous and free from irregularities along the edges thereof, such as apertures, reliefs, cut-outs, stitching, pleats, and the like. In an alternative embodiment, the continuous outer perimeter edge 76 of the front shell member 22 may provide an uninterrupted edge about which to wrap the fabric cover 84. In another alternative arrangement, a separate outermost shell (not shown) comprising a molded thermal plastic may replace the cover assembly 78 and provide an outer, user supporting surface eliminating the need for a fabric-type cover.

Figure 8:
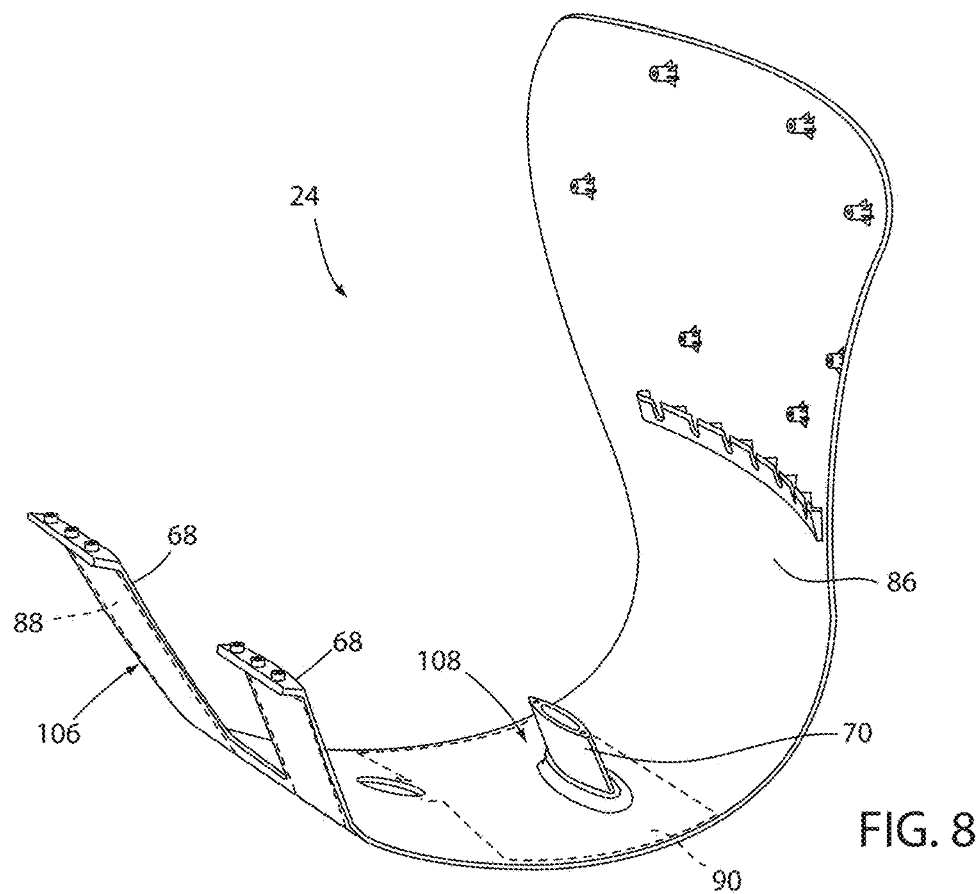
FIG. 8 is a perspective view of a rear shell member with internal components shown in dashed lines.
Figure 9:
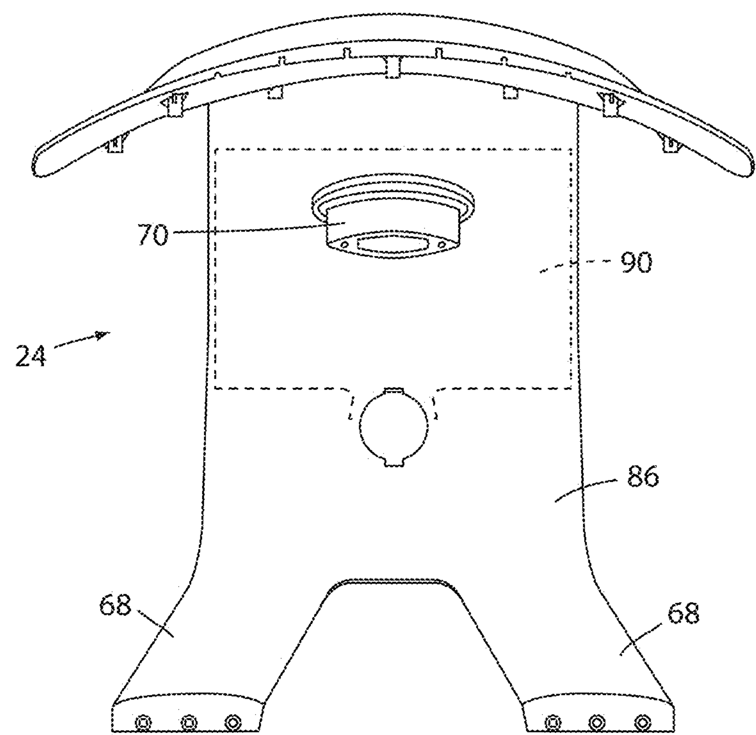
FIG. 9 is a top plan view of the rear shell member with internal components shown in dashed lines.
Figure 10:
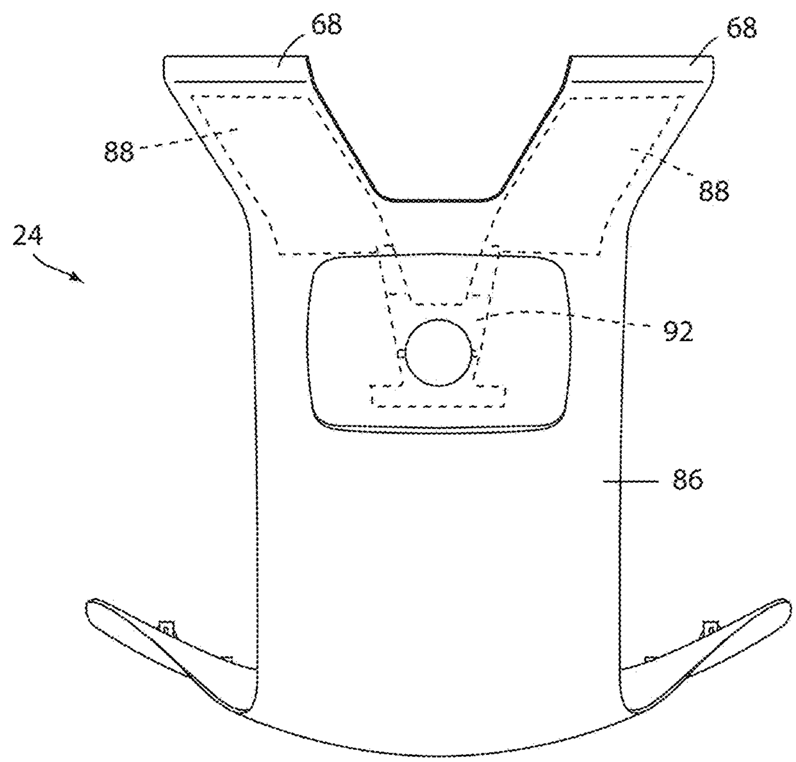
FIG. 10 is a bottom plan view of the rear shell member with internal components shown in dashed lines.
Figure 11:
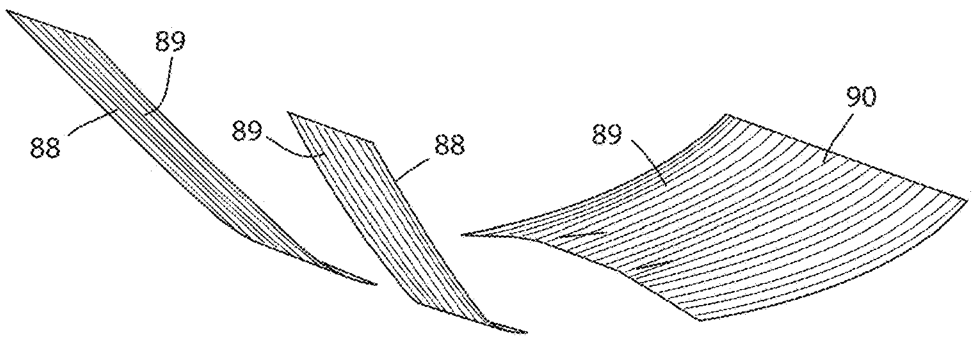
FIG. 11 is a perspective view of forward and rearward reinforcement members.
Figure 12:
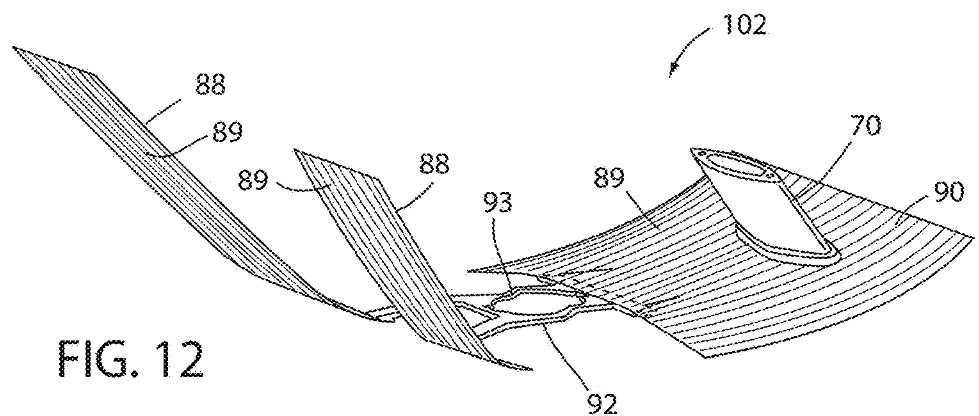
FIG. 12 is a perspective view of an insert.

In one embodiment, and as noted above, the forward support members 68 and the rearward support member 70 are integrally formed with the rear shell member 24. In the present embodiment, the rear shell member 24 (FIGS. 8-10) includes an outer body 86 molded about a pair of resiliently flexible forward reinforcement or biasing members 88 (FIGS. 8-11), a relatively flexible rearward reinforcement or biasing member 90, a central connector body 92 (FIGS. 10 and 12) and the rearward support member 70. The resiliently flexible forward reinforcement members 88 and the resiliently flexible rearward reinforcement member 90 each include a fiber tape that includes a substrate material such as nylon molded about a stranded material such as fiberglass or carbon fibers, however other suitable materials may also be used. In the present embodiment, the stranded material includes a plurality of strands or fibers 89 and preferably comprises fiberglass due to the bonding properties between fiberglass and thermoplastic. Further, the plurality of strands 89 are preferably similarly oriented lengthwise with respect to one another and along the fore-to-aft length of each of the resiliently flexible forward reinforcement members 88 and the flexible rearward reinforcement member 90. In the instant example, the resiliently flexible forward and rearward reinforcement members 88, 90 each comprise a continuous glass, extruded "tape," as commercially available from Plasticomp of Winona, Minnesota, which allows the reinforcement memebers 88, 90 to shape to or assume the same basic shape of the article or component the reinforcement members 88, 90 are molded, adhered or attached to.

The central connector body 92 also includes a central aperture 93 for receiving a column 95 of the base assembly 12 therethrough.

Figure 8A:
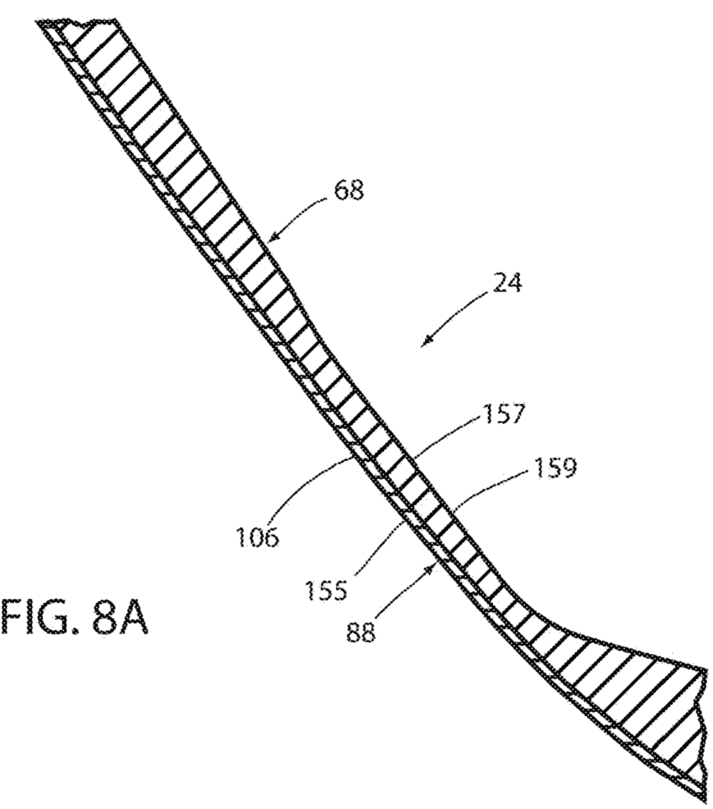
FIG. 8A is an enlarged, partial side view of the area VIIIA, FIG. 7.
Figure 8B:
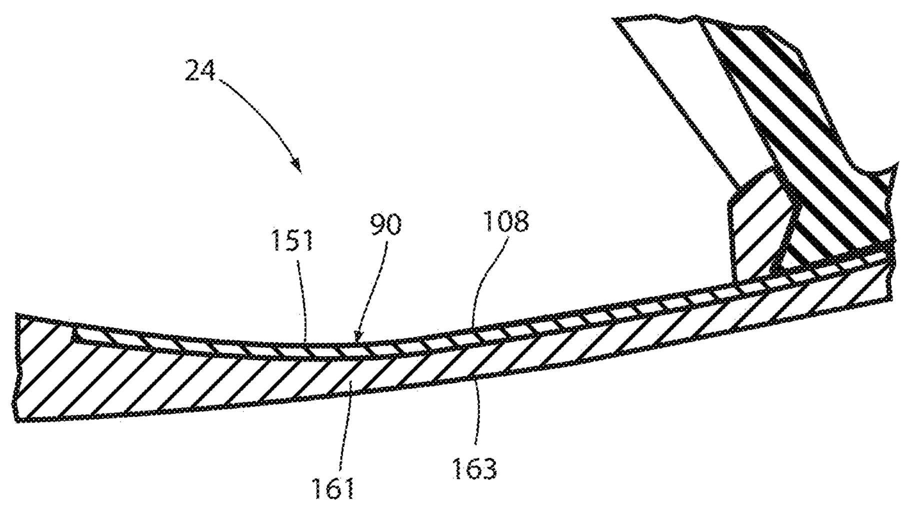
FIG. 8B is an enlarged, partial side view of the area VIIIB.
Figure 13:
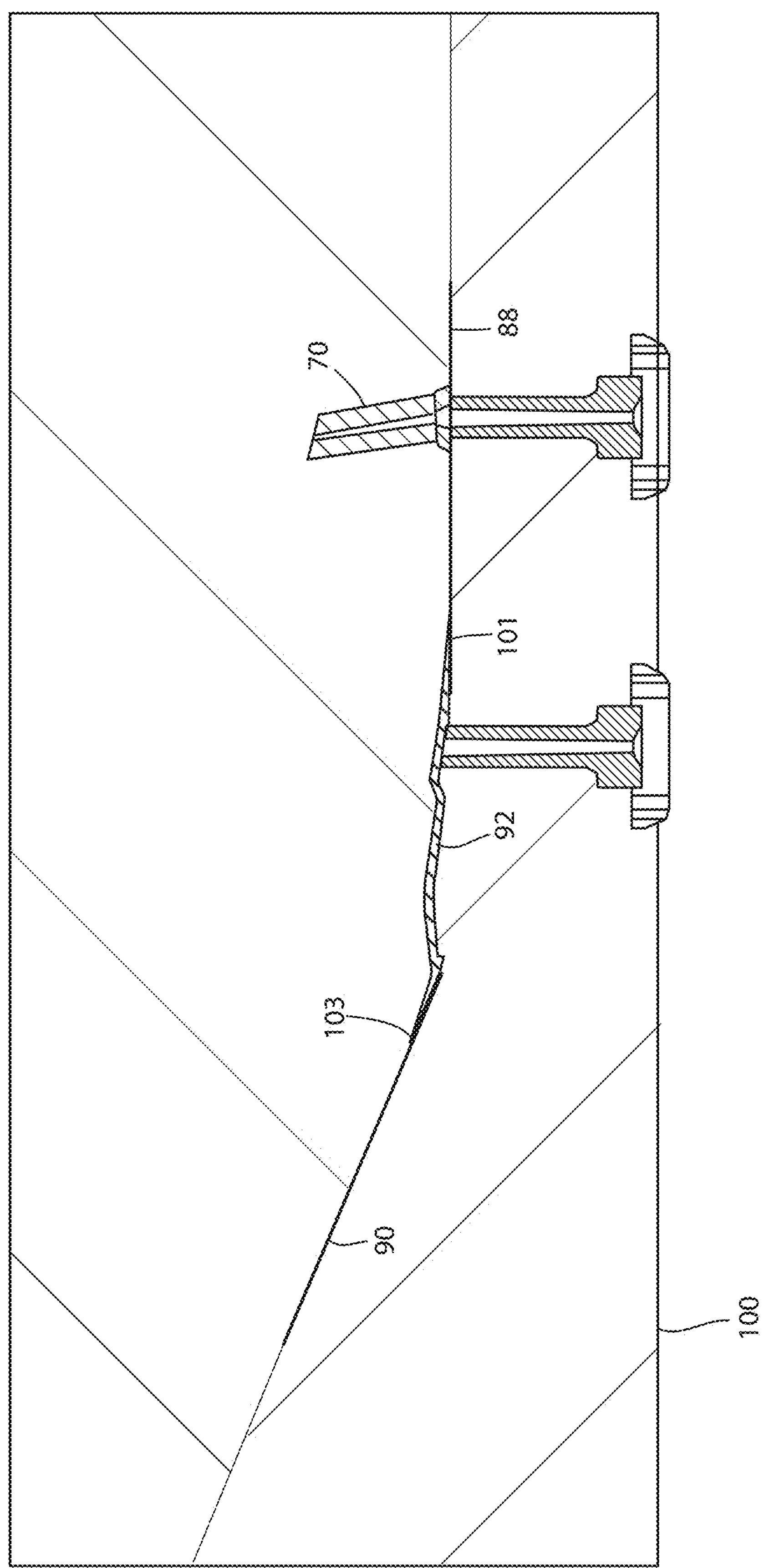
FIG. 13 is a cross-sectional side elevational view of a first mold assembly and the insert.
Figures 13A, 13B:
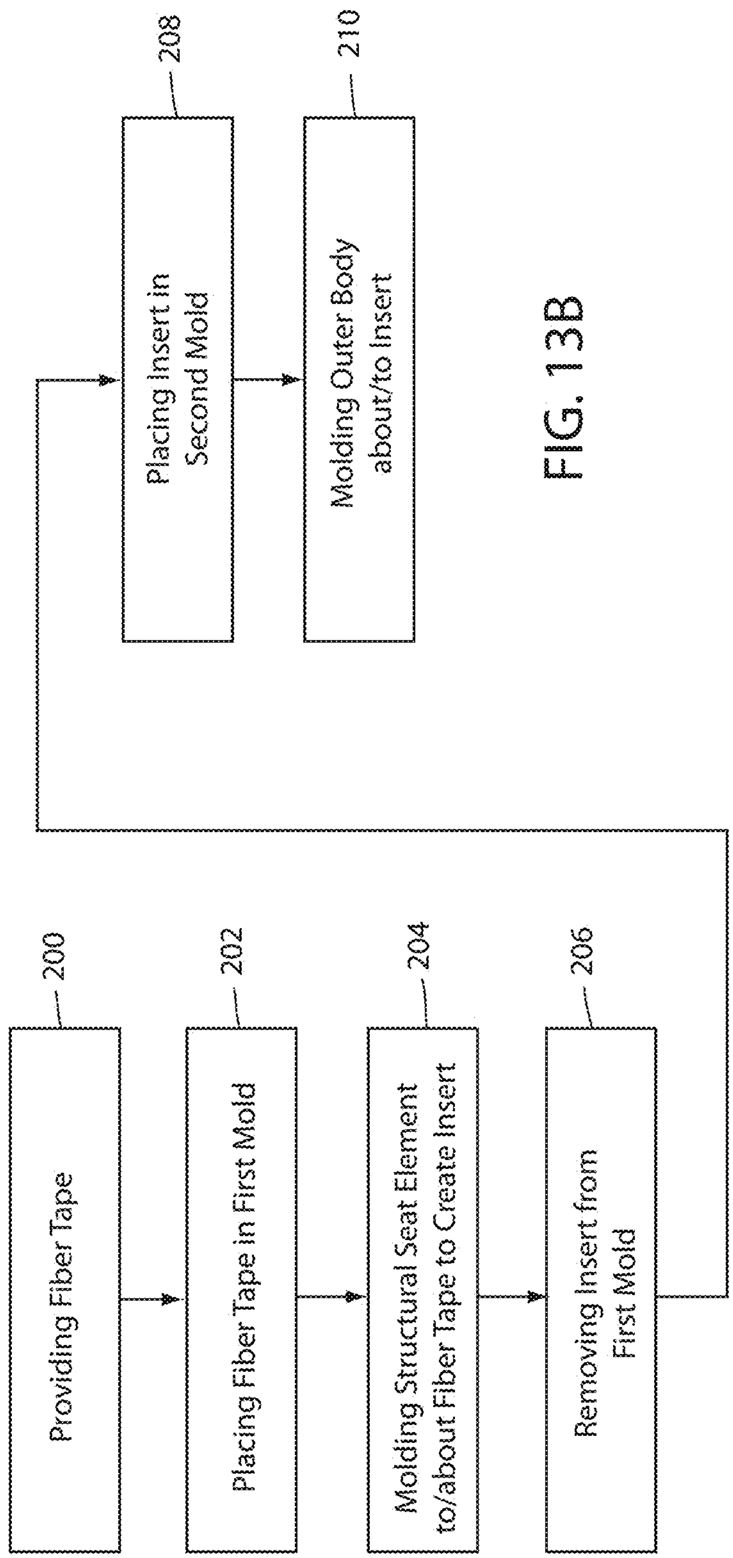
FIG. 13A is a flow chart illustrating a first method for constructing a seat arrangement.
FIG. 13B is a flow chart illustrating a second method for constructing a seat arrangement.
Figure 14A:
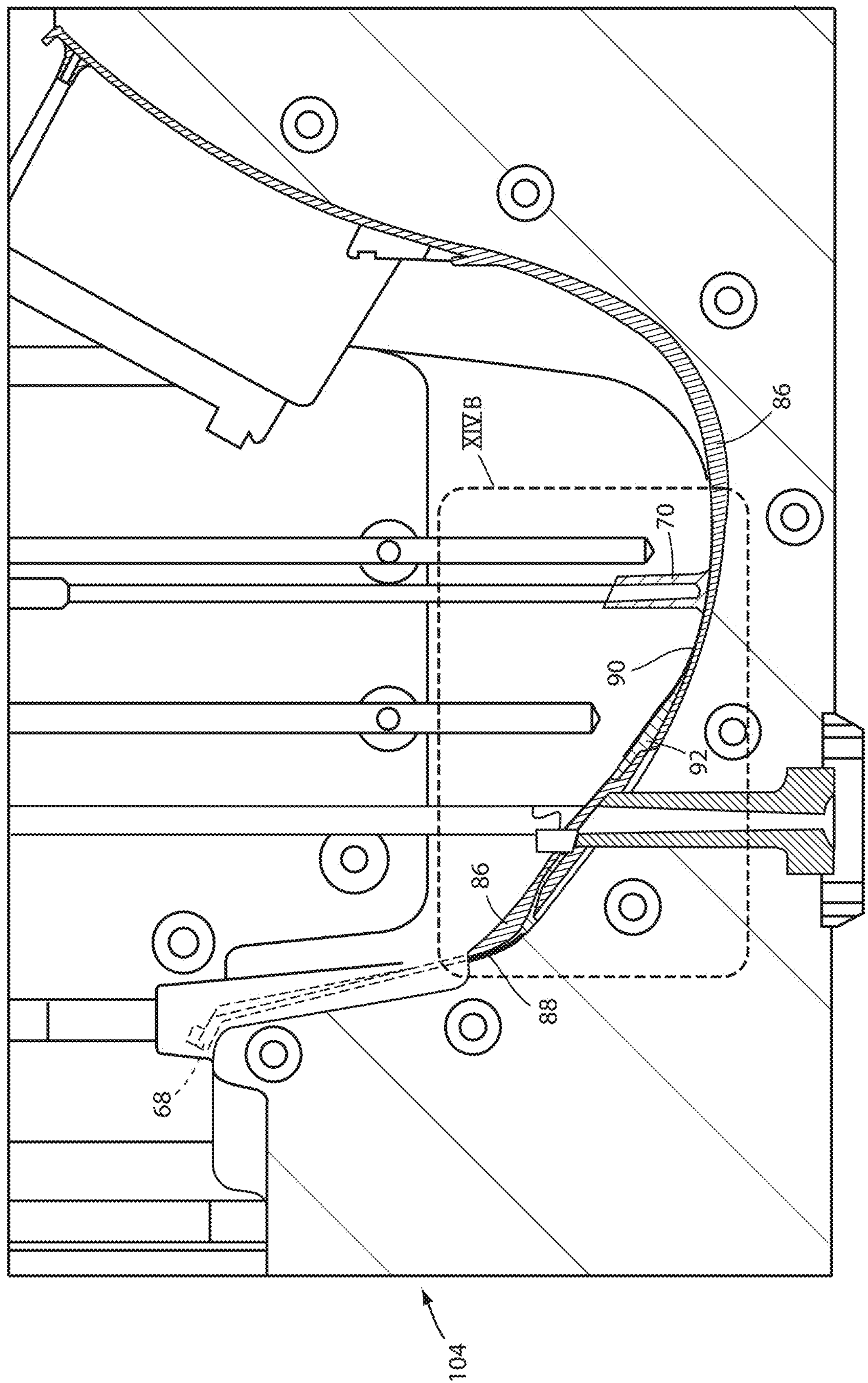
FIG. 14A is a cross-sectional side elevational view of a second mold assembly and the rear shell member.
Figure 14B:
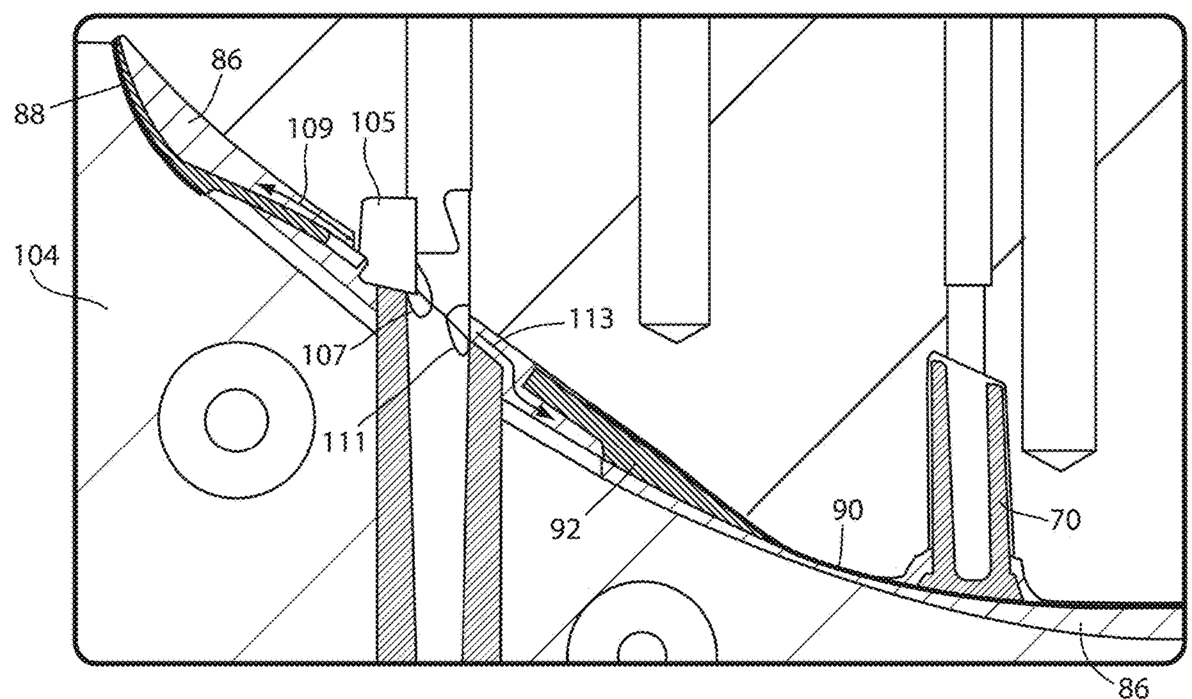
FIG. 14B is an enlarged cross-sectional side view of the area XIVB, FIG. 14A.

In a first molding process (FIG. 13A), the resiliently flexible reinforcement members 88, 90 (FIG. 13) are provided (step 200 (FIG. 13A)) and are placed into a mold assembly 100 (step 202) and may be held in place by mechanical abutment structures, such as suction cups, and/or by an electrostatic force between the reinforcement members 88, 90 and the face of the mold. In the present example, the fiber tape is relatively flexible and entirely spaced from one another. In another example, the multiple pieces of the fiber tape may be positioned with respect to one another external to the mold assembly 100, and may at least partially overlap with one another, and may then be placed within the mold assembly 100 as a pre-oriented or positioned grouping. The central connector body 92 is then molded about a forward edge 101 of the rearward reinforcement member 90 and a rearward edge 103 of the forward reinforcement members 88, thereby connecting the same with one another, while the rearward support member 70 is molded onto the rearward reinforcement member 90, thereby resulting in a single-piece insert 102 (FIG. 12) that includes the forward and rearward reinforcement members 88, 90, the central connector body 92 and the rearward support member 70 (step 204). The central connector body 92 and the rearward support member 70 each preferably comprise a thermoplastic material. The insert 102 is then removed from the mold assembly 100 (step 206). In a second molding process (FIG. 13B) the insert 102 may then be placed in a second mold assembly 104 (FIG. 14A) (step 208), where the outer body 86 is molded about the insert 102 (step 210). As previously noted, the outer body 86 may comprise a flexibly resilient polymer material such as thermoplastic, including for example, nylon, glass-filled nylon, polypropylene, acetyl, or polycarbonate; any thermal set material, including, for example, epoxies; or resin-based composites, including, for example, carbon fiber or fiberglass. In the instant example, the outer body 86 is molded about the insert 102 such that the resiliently flexible forward reinforcement members 88 (FIG. 8A) are located in a tensile side 155 proximate a forward or tensile surface 106 (FIG. 8) where the tensile side 155 is put in tension and the compression side 157 is under compression when the flexing zone 72 deforms as the back assembly 18 is moved from the upright position A to the reclined position B. The resiliently flexible rearward reinforcement member 90 (FIG. 8B) is located in a tensile side 151 proximate an upper or tensile surface 108 opposite a rearward or compression side 161 proximate a rearward or compression surface 163, where the tensile side 151 is put in tension and the compression side 161 is under compression when the flexing zone 74 deforms as the back assembly 18 is moved from the upright position A toward the reclined position B. The selected placement of the reinforcement members 88, 90 flexibly reinforces the areas of the overall structure most subject to bending during recline of the back assembly 18, such as, for example, the flexing regions 72, 74. It is noted that locating the reinforcement members 88, 90 just beneath the outer surfaces 106, 108 provides the outer body 86 with an overall outer surface that may be easily treated, such as by painting, powder coating, and the like. It is further noted that this molding process or method also generally allows the construction of various parts, components, subassemblies and structures that incorporate multi-layers providing various and varied mechanical properties, as well as pre-constructed features into a single-piece element. With reference to FIGS. 14A and 14B, the insert 102 is placed within an interior of the second mold 104. A locking member 105 extends into the apertures 93 of the central connector body 92 and engages the central connector body 92 to hold the insert member 102 in place within the second mold 104. The second mold 104 includes a first gate 107 that provides a flow path 109 and a second gate 111 that provides a flow path 113. It is noted that the first and second flow paths 109, 113 direct the molded material onto the resiliently flexible reinforcement members 88, 90, respectively, in such a manner so as to force the resiliently flexible reinforcement members 88, 90 onto the lower and upper faces of the second mold 104 thereby holding the reinforcement members 88, 90 in position during the molding process. Preferably, the outer body 86 comprises a polypropylene, nylon 66 GF, or nylon 6 GF while the fiberglass strands comprise long glass resins. Further, the outer body 86 preferably comprises equal to or greater than 20% glass by volume, more preferably equal to or greater than 55% glass by volume, and most preferably equal to or greater than 70% glass by volume.

The embodiment of the chair assembly 10 as described above provides a cost effective, reclinable seating arrangement with highly repeatable bending properties and support characteristics. Preferably, the forward support members 68 provide a bend stiffness of between about $$100\frac{\text{in-lb}}{\text{deg}}$$

and about $$2\frac{\text{in-lb}}{\text{deg}},$$

more preferably of between about $$50\frac{\text{in-lb}}{\text{deg}}$$

and about $$5\frac{\text{in-lb}}{\text{deg}},$$

and most preferably of between about $$15\frac{\text{in-lb}}{\text{deg}},$$

and about $$7\frac{\text{in-lb}}{\text{deg}}.$$

The forward, flexible support members 68 further have a maximum thickness along a majority of the length of the forward support members 68 of less than or equal to about 0.5 inches, more preferably of less than or equal to about 0.25 inches, and most preferably of between about 0.150 inches and about 0.040 inches. The resiliently flexible reinforcement members 56, 72 and 74 each have a modulus of elasticity or elastic modulus of preferably between about 700,000 psi and about 5,000,000 psi, more preferably of between about 700,000 psi and about 3,000,000 psi, even more preferably of between about 1,000,000 psi and about 2,000,000 psi, and most preferably of about 1,600,000 psi. The composite material of the resiliently flexible reinforcement members 56, 72, 74 is configured to store a significant amount of energy during deformation while simultaneously resisting fatigue failures. In addition, the composite material and configuration of the members 56, 72, 74 resists deformation in unwanted modes thereby preserving intended movement when subjected to disruptive forces.

Figure 7:
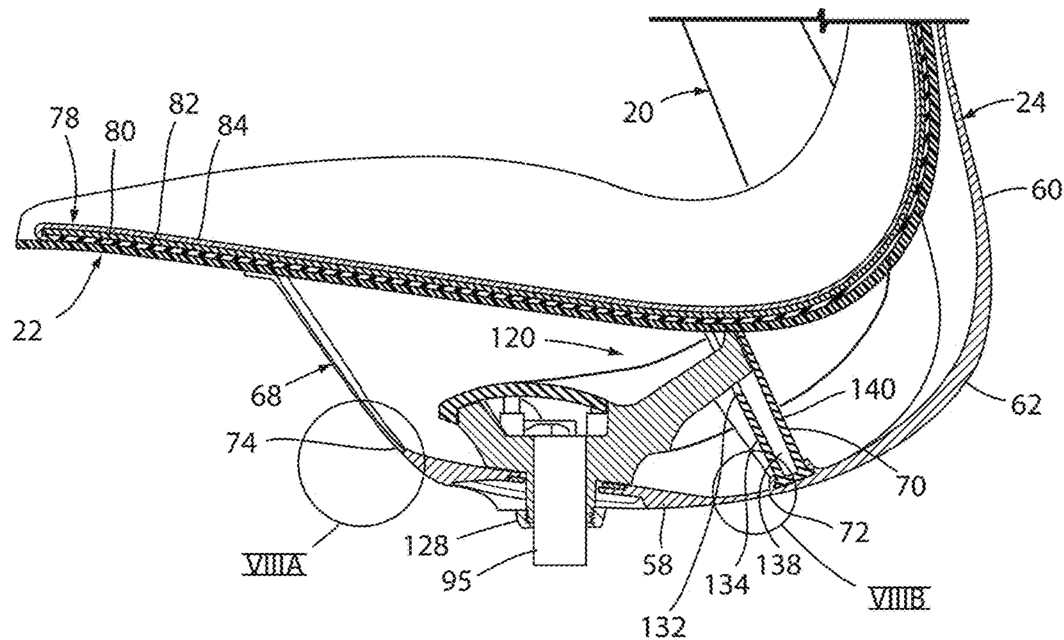
FIG. 7 is a cross-sectional side elevational view of the embodiment of the chair shown in FIG. 30, taken along the line VII-VII, FIG. 1.
Figure 15:
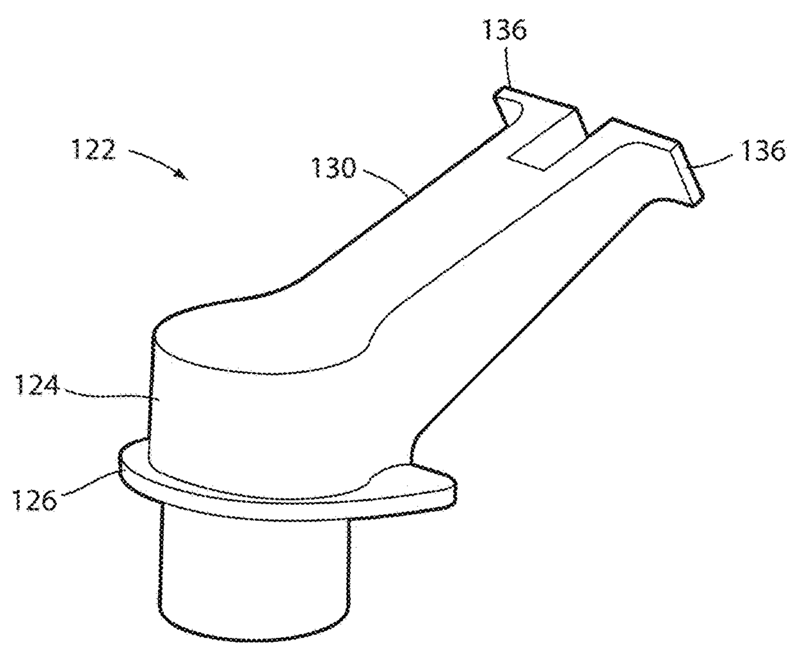
FIG. 15 is a perspective view of a stop member.

The chair assembly 10 further includes a recline stop arrangement 120 (FIG. 7). In the illustrated example, the stop arrangement 120 includes a stop member 122 (FIG. 15) having a cylindrical body portion 124 that receives an upper end of a supporting column 95 therein, a flange 126 that extends about the body portion 124 and that cooperates with a lower coupler 128 to couple the rear shell member 24 and the stop member 122 with the column 95, and a stop arm 130 extending rearwardly from the body portion 124. The stop arm 130 extends through an aperture 132 in a front wall 134 of the rearward support member 70 such that a pair of stops 136 located at a distal end of the stop arm 130 are located within an interior space or cavity 138 of the rearward support member 70 defined between the front wall 134 and a rear wall 140. The stop arm 130 and stops 136 cooperate to form a control rod. In operation, the rearward recline of the back assembly 18 from the upright position A toward the recline position B is limited by the stops 136 abutting the rear wall 140, while a forward tilting of the back assembly 18 from the reclined position B toward the upright position A is limited by the stops 136 abutting the front wall 134. It is noted that the present configuration provides a relatively open chair structure such that the components comprising the flexible four-bar linkage, the arm support structure and portions of the recline limiting arrangement are viewable, while the abutting stop components are concealed from view and within the existing supporting structures and specifically a component of the flexible four-bar linkage.

The present inventive flexible reinforcement arrangement and methods for employing the same may be utilized within various seating configurations and for various applications, seating assemblies, seating structures and seating elements. For example, the reinforcement arrangement may be utilized within weight activated seating arrangements, such as that shown in FIGS. 1-7, or within a non-weight activated seat structure 220, as shown in FIG. 16. The seating structure 220 includes a seat shell member 222 having a horizontally-extending seat portion 224 and a vertically-extending back portion 226 moveable between an upright position and a reclined position similar to as previously discussed above with respect to the seating arrangement 10. In the illustrated example, the shell member includes a U-shaped aperture 227 positioned within the seat portion 224 and extending partially into a transition area 228 located between the seat portion 224 and the back portion 226. The aperture 227 is configured so as to create a bend portion 230 located toward each side of the shell 222 and that adapted to flex as the back portion 226 moves between the upright and reclined positions. The seat structure 220 further includes a pair of resiliently flexible reinforcement members 232 similar in construction as the resiliently flexible reinforcement members 88, 90 as discussed above, and located within an upper or tensile side proximate a tensile surface 234 of the shell 222, where the tensile side is in tension as the back portion moves from an upright to a reclined position.

FIG. 17 illustrates a schematic view of a seat shell member 240 that includes a seat portion 242 and a back portion 244, where the shell member 240 is moveable between an upright position and a reclined position. The shell member 240 may include advantageously-located bend locations where the material of the shell member 240 is configured to bend more easily than the remainder of the shell member 240. In the illustrated example, the shell member 240 may include a first bend location 246 positioned between the seat portion 242 and the back portion 244 providing bend characteristics within the shell member 240 as shown between the upright position X and a reclined position Y. Another potential application is a second bend location 248 located between a forward support portion 250 providing bend characteristics within the shell member 240 as shown between the upright position X and a reclined position Z. Additional applications may include similar arrangements located proximate a lumbar support region 252 (FIG. 18) of a shell member 254, proximate rear seat supporting locations 256 of a seat portion 258, and/or connections 260 between a back portion 262 or other portions of the shell member 254 and a support frame or structure 264.

Figure 19:
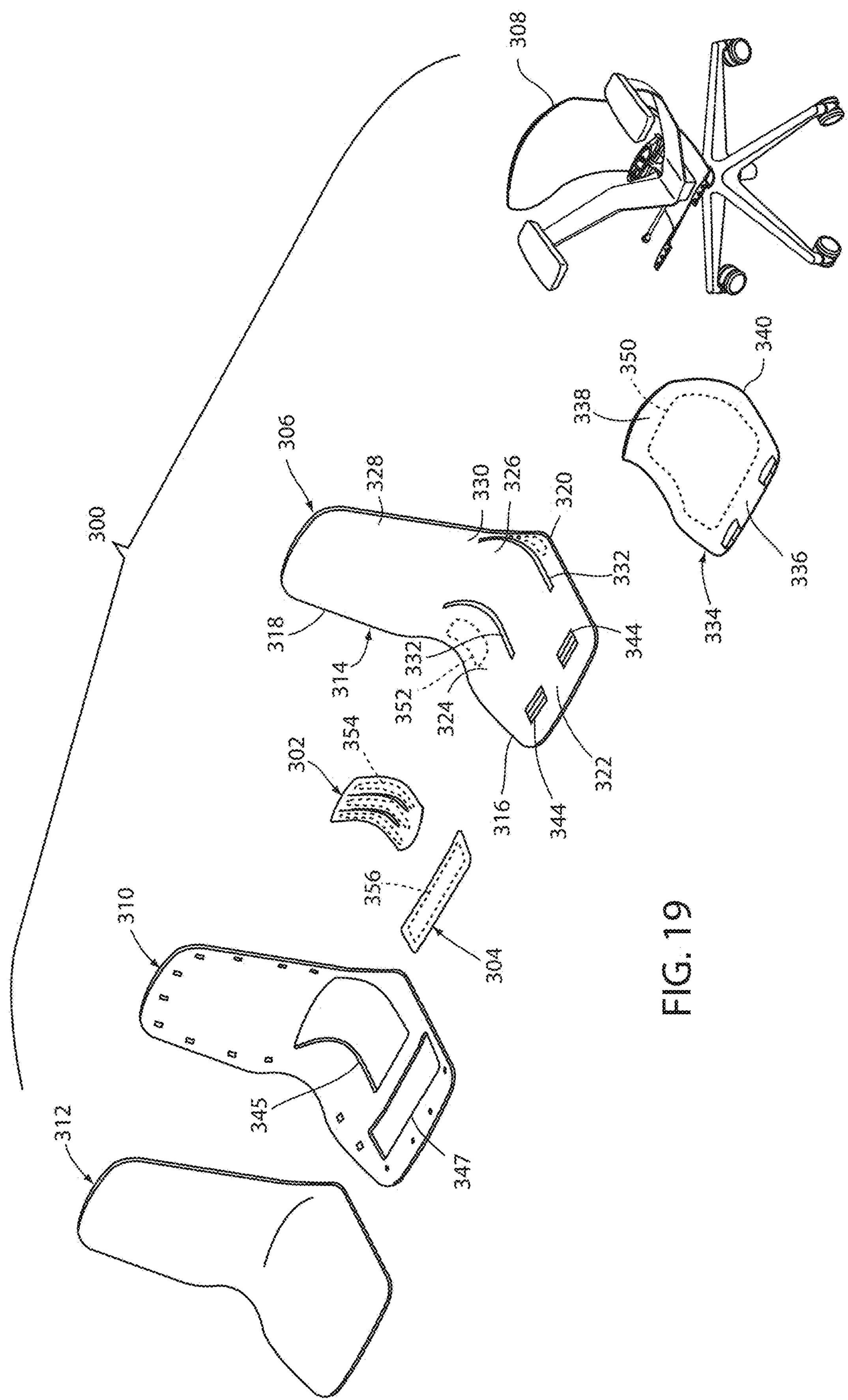
FIG. 19 is an exploded perspective view of an alternative embodiment of a seating arrangement.

The reference numeral 300 (FIG. 19) generally designates another embodiment of the seating arrangement where the flexible reinforcement construction of the rear shell member 24 as described above is used within various and multiple elements and components of the seating arrangement 300. In the illustrated example, the seating arrangement or chair assembly 300 is similar to the chair assembly 10 previously described with the most notable exceptions being the inclusion of a first reinforcement member 302, a second reinforcement member 304, and the construction of the front shell member 306 via a multi-layer over-molding process. In the illustrated example, the chair assembly 300 includes the front or first shell member 306 and the rear or second shell member 308 that is similar to the previously described rear shell member 24, where the front shell member 306 is covered by a substrate layer or comfort surface 310 and a fabric cover assembly 312.

The front shell member 306 includes an outer shell member 314 having a horizontally-extending bottom or first portion 316, a vertically-extending upper or second portion 318 extending upwardly from the first portion 316, and an arcuately-shaped transition portion 320 extending between the first portion 316 and the second portion 318. The first portion 316 includes a forward portion 322 and a rearward portion 324, while the second portion 318 includes a lower portion 326, an upper portion 328 and an arcuately-shaped, forwardly convex mid-portion 330 located therebetween and configured to support the lumbar region of a user's back. The front shell member 306 further includes a pair of laterally-spaced slots 332 extending in a fore-to-aft direction similar to the slots 44 of the chair assembly 10 as previously described with respect to seating arrangement 10.

The front shell member 306 further includes an inner shell portion 334 having a horizontally-extending bottom or first portion 336, a vertically-extending upper or second portion 338, and an arcuately-shaped transition portion 340 extending between the first portion 336 and the second portion 338. In assembly, the inner shell portion 334 is over-molded over the outer shell member 314 such that the inner shell portion 334 covers or overlaps with at least a portion of the bottom portion 316, the upper portion 318 and transition portion 320 at least in the area of the outer shell member 314 surrounding the slots 332. Preferably, the inner shell portion 334 comprises a material that is more flexible than the material from which the outer shell member 314 is constructed, more preferably the inner shell portion 334 and outer shell member 314 each comprise a thermoplastic polymer, and most preferably, the outer shell member 314 comprises polyethylene terephthalate or polybutylene terephthalate, and the inner shell portion 334 comprises a thermoplastic polyolefin.

The chair assembly 300 further includes the reinforcement member 302 located in the transition portion 320 of the front shell member 306, where the reinforcement member 302 may be substantially rigid or flexibly resilient as described below. The reinforcement member 302 is arcuately-shaped to match the arcuate shape of the transition portion 320. In the illustrated example, the reinforcement member 302 may comprise a relatively stiff material, such as metal, and extend along the transition portion 320, such that the reinforcement member 302 prevents the angle between the bottom portion 316 and the upper portion 318 from increasing as the upper portion 318 is moved from the upright position to the reclined position, thereby concentrating compliance or bending in the control arrangement forward of the transition portion 320.

The chair assembly 300 further includes the structural reinforcement member 304 extending between the tabs 344 that are similar to the tabs 54 of the chair assembly 10 as described above. The reinforcement member 304 overlaps with an area of the bottom portion 316 of the shell member 306 so as to disperse forces transmitted between the rear shell 308 and the front shell 306 in the vicinity of the tabs 344. In assembly, the reinforcement members 302, 304 are positioned within corresponding reliefs 345, 347 of the substrate layer 310, respectively.

In the illustrated example, various components and elements may be constructed similar to the rear shell member 24 as previously described, and specifically may comprise resiliently flexible reinforcement members 350, 352, 354, 356 overmolded on an outer body. Preferably, one or more structural reinforcement members comprise a substrate material such as nylon molded about a stranded material such as fiberglass or carbon fibers, however other suitable materials may be used, while the associated outer body may comprise a flexibly resilient polymer material such as any thermoplastic, including, for example, nylon, glass-filled nylon, polypropylene, acetyl, or polycarbonate; any thermo set material, including for example, epoxies; or any resin-based composites, including, for example, carbon fiber or fiberglass.

Figure 20:
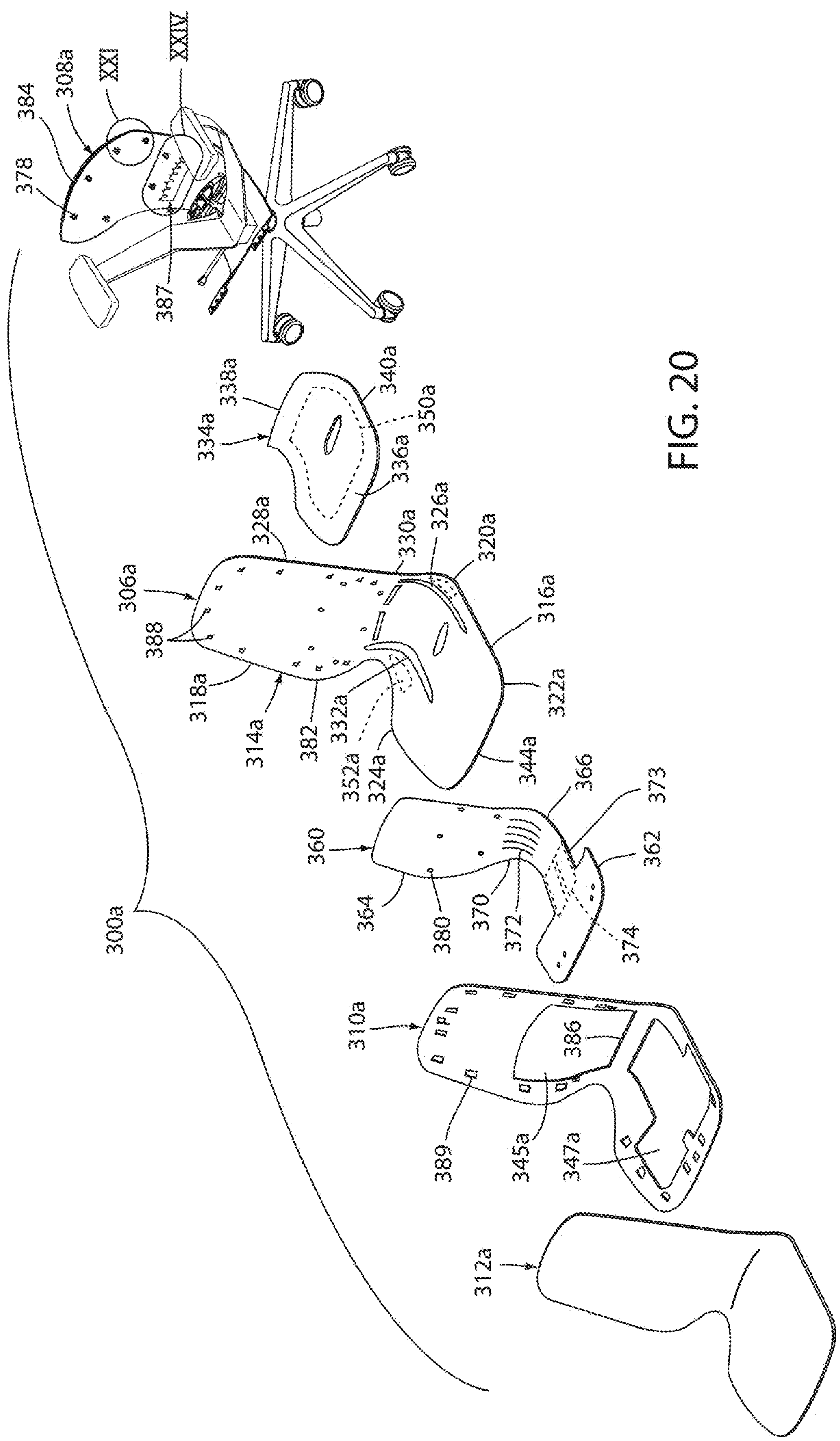
FIG. 20 is an exploded view of an alternative embodiment of a seating arrangement.

The reference numeral 300*a* (FIG. 20) generally designates another embodiment of the seating arrangement. Since the seating arrangement or chair assembly 300*a* is similar to the previously described chair assembly 300, similar parts appearing in FIG. 19 and FIG. 20 respectively are represented by the same, corresponding reference numeral, except for the suffix “a” in the numerals of the latter. In the illustrated example, the integral, single-piece resiliently flexible reinforcement member 360 includes a forward portion 362, a rearward portion 364 and an arcuately-shaped transition portion 366 extending between the first portion 362 and the rearward portion 364. The forward portion 362 is substantially rigid and extends between the tabs 344*a* that are similar to the tabs 54 of the chair 10 as described above, and overlaps with an area of the bottom portion 316*a* of the shell member 306*a* so as to disperse forces transmitted between the rear shell 308*a* and the front shell 306*a* in the vicinity of the tabs 344*a*. The rearward portion 364 is substantially rigid and extends upwardly from the forward portion 362 such that the rearward portion 364 is aligned with and structurally supports the mid-portion 330*a* of the upper portion 318*a* of the front shell 306*a*. The transition portion 366 includes a substantially rigid zone 370 that may be rigidified by a plurality of longitudinally-extending ribs 372 so as to disperse forces exerted on the mid-portion 330*a* by a seated user and structurally reinforce the same, and a resiliently flexible zone 373 positioned forwardly of the rigid zone 370. The substantially rigid forward portion 362, the substantially rigid rearward portion 364 and the substantially rigid zone 370 of the transition portion 366 cooperate to concentrate the deformation of the forward shell 306*a* in a portion of the forward shell 306*a* proximate the resiliently flexible zone 373. In the present example, the resiliently flexible reinforcement member 360 may be constructed similarly to the rear shell member 24 as previously described where the flexible zone 373 of the resiliently flexible reinforcement member 360 includes a tensile side or side in tension proximate a tensile surface and a compression side or side under compression proximate a compression surface, where the tensile side is put in tension and the compression side is under compression when the flexible zone 373 deforms as the back assembly is moved from the upright position to the reclined position. Similar to the rear shell member 24, the resiliently flexible reinforcement member 360 may include a tensile substrate in the form of a plurality of longitudinally-aligned glass fibers in-molded within an outer shell comprising a glass-filled nylon, preferably where a majority of the plurality of fibers are located within the tensile side, and more preferably where all of the plurality of fibers are located within the tensile side.

In assembly, the rearward portion of the resiliently flexible reinforcement member 360 is attached to the rear shell member 308*a* by a plurality of mechanical fasteners 378 that are received through corresponding apertures 380 of the resiliently flexible reinforcement member 360, apertures 382 of the front shell member 306*a*, and into bosses 384 (FIG. 21) of the rear shell member 308*a*, where the bosses 384 are received within corresponding reliefs 385 (FIGS. 22 and 23) surrounding each of the apertures 382 of the front shell 306*a*. The rearward portion 364 and the forward portion 362 of the resiliently flexible reinforcement member 360 are received within corresponding reliefs 345*a*, 347*a* of the substrate layer or comfort member 310*a*, while a central portion 386 of the substrate layer 310*a* extends over the transition portion 366 of the resiliently flexible reinforcement member 360. A plurality of couplers 388 attach the substrate layer 310*a* to the front shell member 306*a*. The rear shell 308*a* (FIGS. 22 and 24) also includes a forwardly-extending, integral engagement shelf 387 that engages a lip 389 (FIG. 25) defined by a laterally-extending, elongated aperture 391 of the front shell 306*a* (FIG. 26) such that the front shell 306*a* is coupled with the rear shell 308*a* in the vicinity of the engagement shelf 387 and lip 389 and such that forces exerted on the front shell 306*a* are supported by the rear shell 308*a*.

Figure 27:
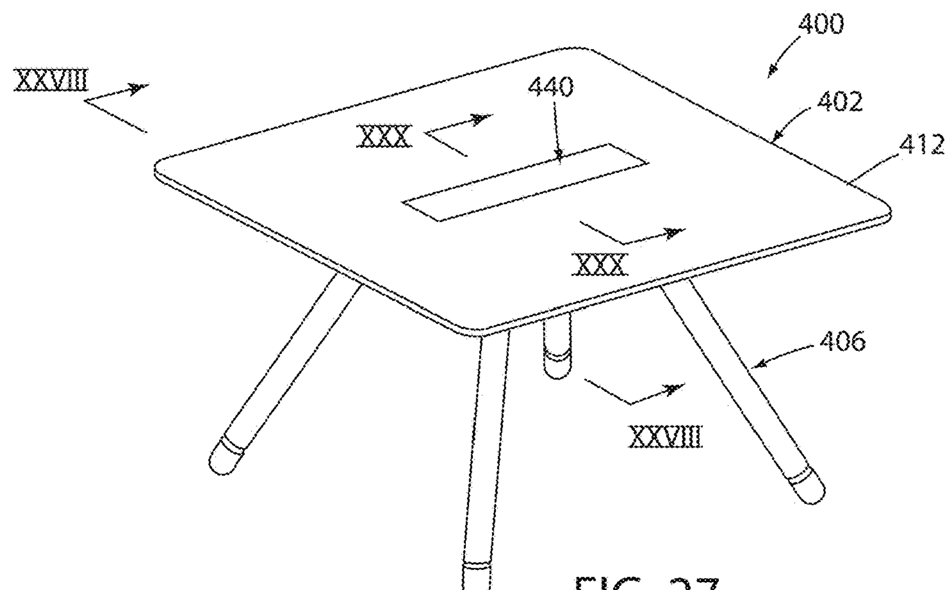
FIG. 27 is a perspective view of a table arrangement.
Figure 28:
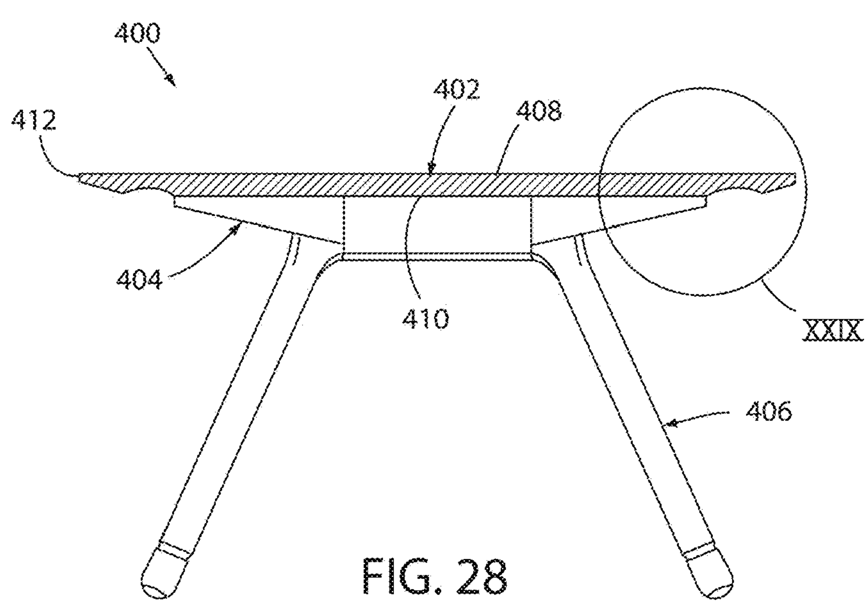
FIG. 28 is a cross-sectional view of the table arrangement taken along the line XXVIII-XXVIII, FIG. 27.
Figure 29:
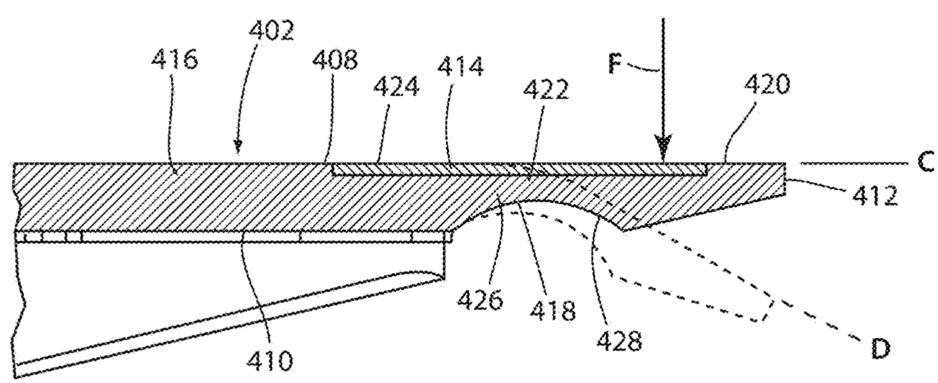
FIG. 29 is an enlarged, cross-sectional view of the area XXIX, FIG. 28.

The resiliently flexible reinforcement arrangements as described herein may also be utilized in other components or assemblies, such as, for example, other furniture components. For example, a resiliently flexible arrangement may be utilized within a table assembly 400 (FIG. 27) that includes a work surface 402 supported by a frame assembly 404 (FIG. 28) which is in turn supported by a plurality of legs 406. In the instant example, the work surface 402 (FIG. 29) includes a top surface 408, a bottom surface 410 and an outer peripheral edge 412, and comprises a tensile substrate 414 covered by a body portion 416 overmolded onto the tensile substrate 414 in a manner similar to the process described above with respect to the rear shell member 24 of the seating arrangement 10. Preferably, the tensile substrate 14 includes a substrate material such as nylon molded about a stranded material such as fiberglass or carbon fibers, however other suitable materials may be used, while the associated outer body may comprise a flexibly resilient polymer material such as any thermoplastic, including, for example, nylon, glass-filled nylon, polypropylene, acetyl, or polycarbonate; any thermo set material, including for example, epoxies; or any resin-based composites, including, for example, carbon fiber or fiberglass. The tensile substrate 414 may be positioned in an area of the work surface 402 having a reduced thickness 418, and preferably includes a plurality of longitudinally aligned strands such as glass fibers that extend in a radial direction across the area of reduced thickness 418 in mold within a poly material. In the illustrated example, the work surface 402 includes a peripheral lip 420 configured to deflect downwardly from an upright position C to a deflected position D upon exertion of sufficient force F. The outer body 416 is molded about the tensile substrate 414 such that the tensile substrate 414 is located in a tensile side 422 proximate an upper or tensile surface 424 opposite a bottom or compression side 426 proximate a bottom or compression surface 428, where the tensile side 422 is put in tension and the compression side 426 is under compression when the area of reduced thickness or flexing zone 418 is deformed as the lip 420 is moved from the upright position C to the deflected position D, and such that the tensile substrate 414 biases the lip 420 from the deflected position D toward the upright position C.

Figure 30:
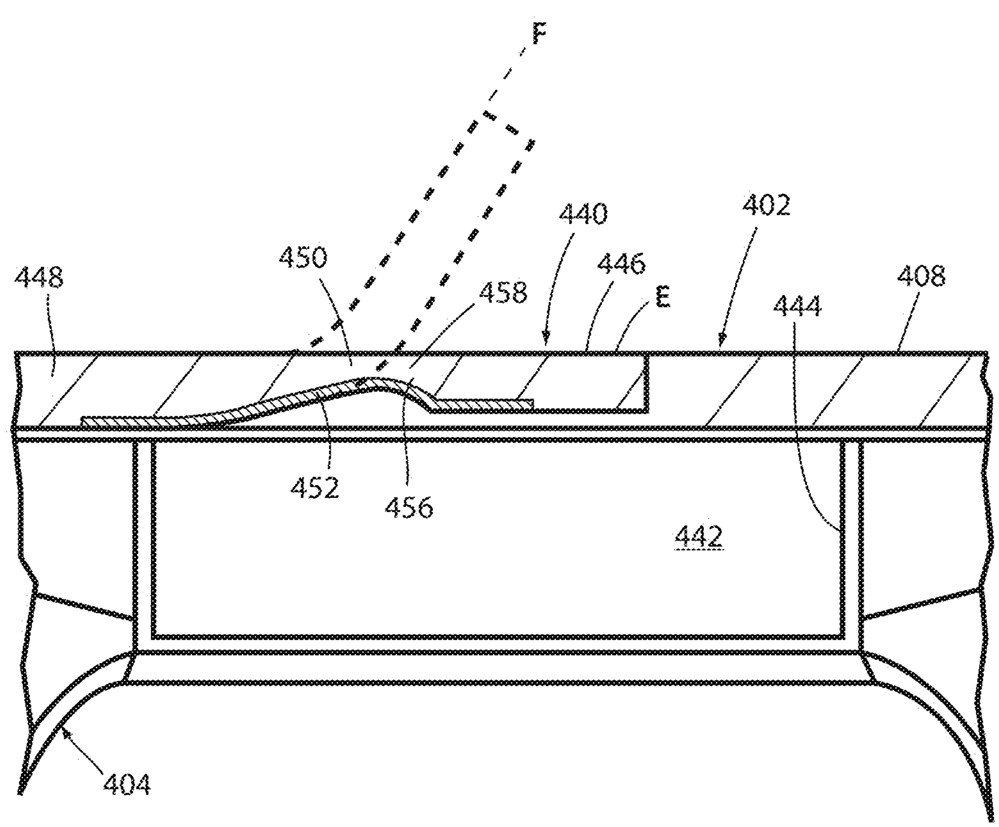
FIG. 30 is an enlarged, cross-sectional view taken along the line XXX-XXX, FIG. 27.

In yet another embodiment, the resiliently flexible arrangement is utilized within a door arrangement 440 positioned within the work surface 402 and configured to allow access through the work surface 402 and into an interior 442 (FIG. 30) of a wireway or wire trough 444 positioned below the work surface 402. The door arrangement 440 includes a door 446 integrally connected to a body portion 448 of the work surface 402 via a flexing zone 450 having a relatively reduced thickness. The flexing zone 450 includes a tensile substrate 452 constructed similar to the tensile substrate 414 described above and positioned within a tensile side 454 of flexing zone 450 opposite a compression side 456 thereof. The door arrangement 40 is configured such that a user may move the door 446 from the position E to the open position F thereby allowing access to the interior 442, and such that the tensile substrate 452 biases the door 446 from the open position F toward the closed position E.

It is noted that in each of the aforedescribed embodiments, the seating arrangement and furniture arrangements are configured such that some, many, or all of the components may be visible from an exterior of the arrangements subsequent to the arrangements being completely manufactured and assembled, such that the visible components form an outer aesthetic appearance of the arrangement, or alternatively may be enclosed within an interior of the arrangement such that the components are not visible to the casual observer. In the case of the seating arrangement, components such as the forward support member, the rearward support member, the support member, as well as the stop arrangements as described may be at least partially visible from an exterior of the chair, and cooperate to form an overall outer aesthetic thereof. Certain embodiments may include some, many, or all of the components described herein. For example, an embodiment may include one or more apertures, one or more of the stop systems, and/or components or materials selected for performance purposes, e.g., to bias the seat arrangement to an upright position or for material strength requirements. In some embodiments, a selection of a particular component may influence the selection of various other components. For example, using a particular aperture or apertures may dictate what type of components or materials should be used for performance purposes and vice versa.

Various embodiments of the seating arrangements described herein may provide a platform with the proper fit and function for comfortably supporting a seated user that may also reduce or shift costs, for example by reducing associated part counts, manufacturing costs, and labor costs. Certain aspects of the seating arrangements may include an uncomplicated, durable, and visually appealing design capable of a long operating life, and particularly well adapted for the proposed use.

In the foregoing description, it will be readily appreciated by those skilled in the art that modifications may be made to the described embodiments without departing from the concepts disclosed herein. Such modifications are to be considered as included in the following claims, unless these claims by their language expressly state otherwise.

The invention claimed is:

1. A seating arrangement, comprising:
- a base member; and
- an integrally formed support member coupled to the base member and supporting a seat having a first portion configured to support a seated user thereon and a second portion moveable from an upright position to a reclined position, wherein a portion of the support member is bendable as the seat moves from the upright position to the reclined position such that a first side of the support member is put in tension and a second side generally opposite the first side is put in compression, and wherein the first side includes a tensile substrate so that the first side has a higher modulus of elasticity than the second side.

2. The seating arrangement of claim 1, wherein the first side is an upper side of the support member.

3. The seating arrangement of claim 1, wherein the tensile substrate includes a plurality of strands.

4. The seating arrangement of claim 3, wherein the plurality of strands includes glass fiber.

5. The seating arrangement of claim 1, wherein all the tensile substrate is located in the first side.

6. The seating arrangement of claim 1, wherein the bendable portion of the support member comprises a thermoplastic.

7. The seating arrangement of claim 6, wherein the tensile substrate comprise a material configured to bond to the thermoplastic.

8. The seating arrangement of claim 1, wherein the seating arrangement comprises an office chair assembly.

9. A seating arrangement, comprising:
- a first portion of a seating component;
- a second portion of the seating component moveable with respect to the first portion between a first position and a second position;
- a transition portion of the seating component positioned between the first portion and the second portion, where the transition portion is configured to deform as the second portion is moved from the first position to the second position, the transition portion including a surface in tension as the transition portion is deformed and a surface under compression as the transition portion is deformed; and a stranded material attached to the surface in tension of the transition area;

wherein the stranded material biases the second portion from the second position toward the first position.

10. The seating arrangement of claim 9, wherein the stranded material is attached to the surface in tension via an adhesive.

11. The seating arrangement of claim 9, wherein the stranded material includes a plurality of strands.

12. The seating arrangement of claim 11, wherein the stranded material includes a plurality of strands that are longitudinally-aligned with one another.

13. The seating arrangement of claim 12, wherein the plurality of strands extend in a substantially fore-to-aft direction.

14. The seating arrangement of claim 11, wherein the transition portion comprises a thermoplastic.

15. The seating arrangement of claim 14, wherein the plurality of strands comprise a material configured to bond to the thermoplastic.

16. A method of constructing a seating arrangement, comprising:

providing a first material comprising a plurality of strands extending lengthwise with respect to one another;

placing the first material in a mold; and molding a second material to the first material to form a seating component having a first portion, a second portion, and a deformable transition portion positioned between the first and second portions, a side in tension as the transition portion is deformed and a side under compression as the transition portion is deformed, wherein a majority of the strands are positioned in the side under tension.

17. The method of claim 16, wherein the plurality of strands include glass fiber.

18. The method of claim 16, wherein the plurality of strands extend in a substantially fore-to-aft direction.

19. The method of claim 16, wherein the transition portion comprises a thermoplastic.

20. The method of claim 19, wherein the plurality of strands comprise a material configured to bond to the thermoplastic.

21. The method of claim 16, wherein all of the plurality of strands are located in the side in tension.

22. A seating arrangement, comprising:

a first portion of a seating component;

a second portion of the seating component moveable with respect to the first portion between a first position and a second position; and a transition portion of the seating component positioned between and integral with the first and second portions and configured to deform as the second portion is moved between the first and second position, the transition portion including a side in tension as the transition portion is deformed, a side under compression as the transition portion is deformed and a plurality of longitudinally-aligned strands where a majority of the plurality of strands of the transition portion are positioned in the side in tension, wherein the plurality of strands bias the second portion from the second position toward the first position.

23. The seating arrangement of claim 22, further comprising:

a seat shell that includes the first portion, the second portion and the transition portion.

24. The seating arrangement of claim 22, wherein the first portion includes a seat portion configured to support a seated user, and the second portion includes a back portion extending substantially upward from the seat portion.

25. The seating arrangement of claim 22, further comprising:

a back configured to support the back of a seated user, wherein the transition portion flexes as a back of the seating arrangement moves between an upright position and a reclined position and biases the back from the from the reclined position toward the upright position.

26. The seating arrangement of claim 22, wherein the plurality of strands include glass fiber.

27. The seating arrangement of claim 22, wherein the plurality of strands extend in a substantially fore-to-aft direction.

* * * * *

UNITED STATES PATENT AND TRADEMARK OFFICE

CERTIFICATE OF CORRECTION

PATENT NO. : 11,825,955 B2
APPLICATION NO. : 17/183461
DATED : November 28, 2023
INVENTOR(S) : Nickolaus William Charles Deevers et al.

It is certified that error appears in the above-identified patent and that said Letters Patent is hereby corrected as shown below:

On the Title Page

Item (57), Abstract, Line 3:
"moveable" should be – movable –

Item (57), Abstract, Line 10:
"as" should be – a –

In the Specification

Column 1, Line 34:
"moveable" should be – movable –

Column 2, Line 1:
After "modulus" insert -- of --

Column 2, Line 14:
"position" should be – positions –

Column 2, Line 38:
After "of" insert -- the --

Column 2, Line 50:
"moveable" should be – movable –

Column 3, Line 24:
"moveable" should be – movable –

Column 3, Line 28:
"moveable" should be – movable –

Signed and Sealed this
Fifth Day of November, 2024

Katherine Kelly Vidal

Katherine Kelly Vidal
*Director of the United States Patent and Trademark Office*

Column 3, Line 44:
“position” should be – positions –

Column 3, Lines 47-48:
After “plurality” insert -- of --

Column 4, Line 6:
“portion” should be – portions –

Column 4, Line 36:
After “component” insert -- , --

Column 4, Line 41:
“as” should be – a –

Column 4, Line 46 (1st occurrence):
“of” should be – a –

Column 4, Line 61:
“separate” should be – second –

Column 5, Line 17:
“position” should be – positioned –

Column 5, Line 19:
“material” should be – materials –

Column 5, Line 40:
“space” should be – spaced –

Column 5, Line 49:
After “greater” insert -- than --

Column 5, Line 53:
“seat” should be – seating –

Column 5, Line 56:
“space” should be – spaced –

Column 5, Line 60:
After “link” insert -- member --

Column 5, Line 64:
After “link” insert -- member --

Column 5, Line 66:
"that" (2nd occurrence) should be – than –

Column 6, Line 63:
After "3" delete "."

Column 6, Line 64:
"recline" should be – reclined –

Column 7, Line 30:
"side-elevational" should be – side elevational –

Column 7, Line 32:
"side-elevational" should be – side elevational – [consistency]

Column 8, Line 57:
"recline" should be – reclined –

Column 9, Line 29:
"second" should be – first –

Column 9, Line 30, 33:
"member" should be – members –

Column 9, Line 62:
"second" (2nd occurrence) should be – first –

In the Claims

Column 20, Claim 22, Line 11:
"position" should be – positions –

Column 20, Claim 25, Line 34:
Delete "from the" (2nd occurrence)